US006958762B2

(12) United States Patent
Franklin

(10) Patent No.: US 6,958,762 B2
(45) Date of Patent: Oct. 25, 2005

(54) FILLING AN AREA OF AN IMAGE MARKED ON A MATERIAL WITH A LASER

(75) Inventor: Kevin Franklin, San Diego, CA (US)

(73) Assignee: Markem Corporation, Keene, NH (US)

( * ) Notice: Subject to any disclaimer, the term of this patent is extended or adjusted under 35 U.S.C. 154(b) by 0 days.

(21) Appl. No.: 10/999,784

(22) Filed: Nov. 29, 2004

(65) Prior Publication Data

US 2005/0123864 A1 Jun. 9, 2005

Related U.S. Application Data

(60) Provisional application No. 60/528,330, filed on Dec. 9, 2003.

(51) Int. Cl.⁷ ............................................. B41J 2/435
(52) U.S. Cl. ..................... 347/225; 219/121.8; 358/1.1
(58) Field of Search .................... 219/121.6, 121.8; 358/1.1, 1.2; 382/276; 347/224, 225, 171

(56) References Cited

U.S. PATENT DOCUMENTS 6,424,430 B1 * 7/2002 Bilodeau et al. ............. 358/1.2
6,791,592 B2 * 9/2004 Assa et al. ................... 347/225

* cited by examiner

*Primary Examiner*—Huan Tran
(74) *Attorney, Agent, or Firm*—Fish & Richardson P.C.

(57) ABSTRACT

A system converts graphic images, such as those created by graphics applications, to a format that can be efficiently printed on a material by a laser printing system. An image can be converted to a set of locations by defining progressively smaller contours of the image, and a material can be marked by directing a laser beam according to the locations. Converting the image can involve identifying a set of points that trace boundary pixels of a marking area of the image such that the set of points form a contour of the marking area, removing the boundary pixels from further consideration with respect to defining the contours for the marking area, repeating the identifying and the removing until all pixels of interest in the marking area have been considered, and determining the locations from the identified points.

38 Claims, 24 Drawing Sheets

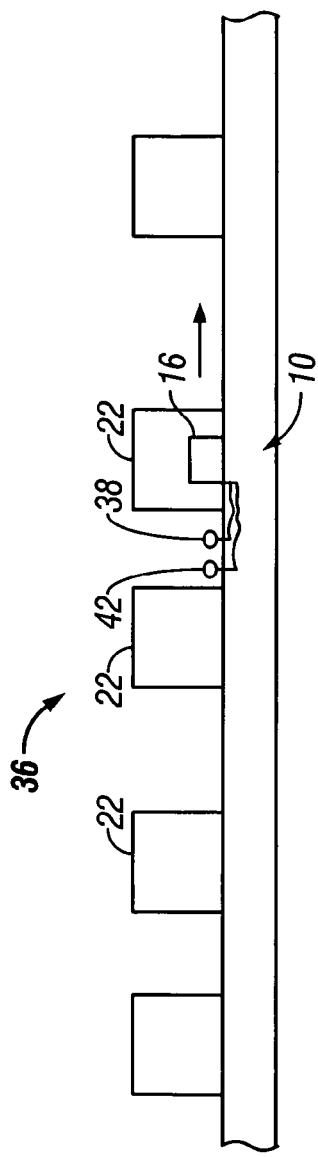
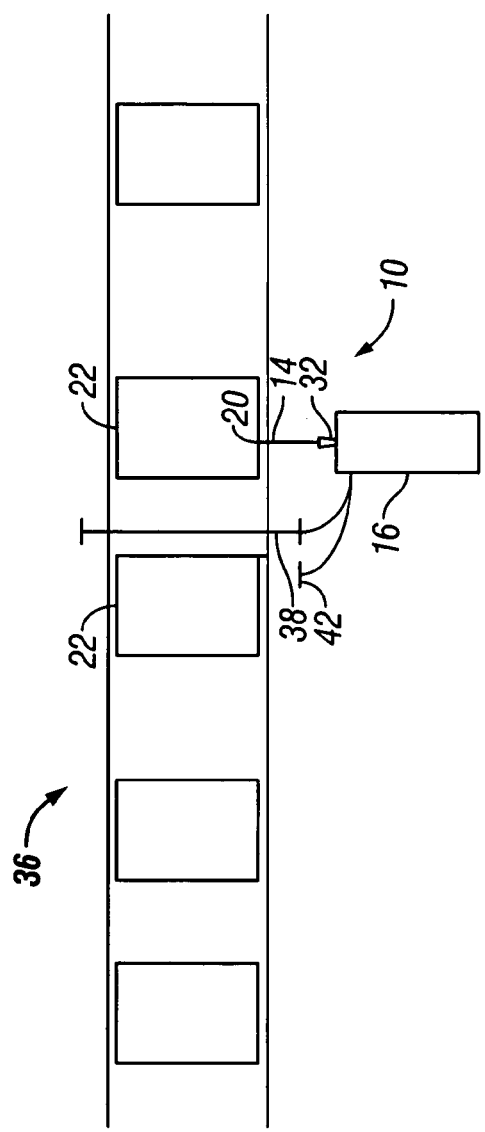

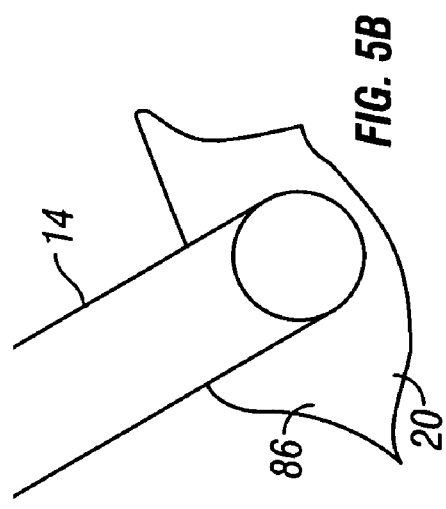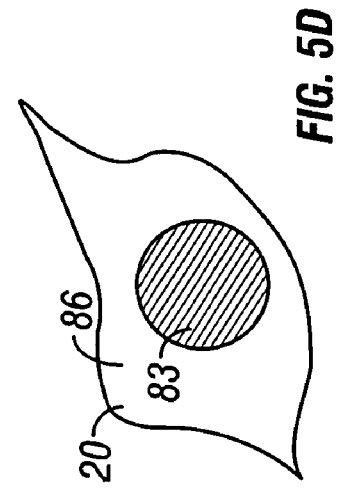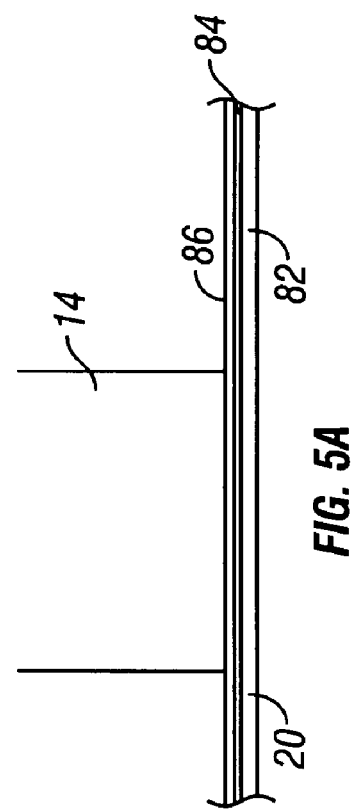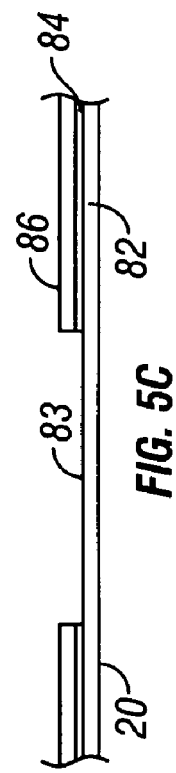
FIG. 5A
FIG. 5B
FIG. 5C
FIG. 5D

```
BIT 1    D0 = 2     DIAGONAL
         D1 = 1
         D2 = 4
         D3 = 8
         H0 = 512   HORIZONTAL
         H1 = 256
         H2 = 1024
  •      H3 = 2048
  •      V0 = 32    VERTICAL
  •      V1 = 16
         V2 = 64
         V3 = 128
         PD0 = 4096 PREVIOUS DIAGONAL
         PD3 = 8192
         ND1 = 16584 NEXT DIAGONAL
BIT 16   ND2 = 32768
```

| LINE | | | DIRECTION |
|---|---|---|---|
| D0= | 1,2 | ↔ 0,1 | NW, SE |
| D1= | 0,1 | ↔ 0,2 | SW, NE |
| D2= | 0,2 | ↔ 2,1 | SE, NW |
| D3= | 2,1 | ↔ 1,2 | NE, SW |
| H0= | 1,0 | ↔ 0,1 | W, E |
| H1= | 0,1 | ↔ 0,0 | W, E |
| H2= | 2,0 | ↔ 2,1 | E, W |
| H3= | 2,1 | ↔ 3,0 | E, W |
| V0= | 1,2 | ↔ 1,0 | N, S |
| V1= | 0,0 | ↔ 1,2 | S, N |
| V2= | 0,2 | ↔ 2,0 | S, N |
| V3= | 3,0 | ↔ 1,2 | N, S |
| PD0= | 0,2 | ↔ 4,1 | NW, SE |
| PD3= | 5,1 | ↔ 0,2 | NE, SW |
| ND1= | 1,1 | ↔ 1,2 | SW, NE |
| ND2= | 1,2 | ↔ 3,1 | SE, NW |

FILLING AN AREA OF AN IMAGE MARKED ON A MATERIAL WITH A LASER

CROSS REFERENCE TO RELATED APPLICATIONS

This application claims the benefit of priority from U.S. Provisional Application entitled "Method of Using Concentric Border Outlines To Fill a Graphic To Be Marked on a Product with a Laser", filed Dec. 9, 2003, and assigned Application Ser. No. 60/528,330.

BACKGROUND

Existing laser printers for marking products use software to fill solid areas of a graphic image, such as a company logo, by cross-hatching. Cross-hatching creates many short vectors or lines, which require a laser to be repeatedly switched on and off. "Vectors" refer to steering a laser beam and turning the laser on and off to form lines. Switching the laser repeatedly on and off shortens the working life of the laser. Delays are introduced while vectors complete, mirrors position and the laser beam starts and stops for each vector. Also, cross-hatching may create a texture in conflict with the image being marked.

SUMMARY

The present disclosure relates to a system and method for filling an area of an image marked on a material with a laser. The system can include a software application that converts graphic images created by graphics applications to a format that can be efficiently printed on a product by a laser printing system. To convert the graphic images, the application uses concentric outlines to fill areas of the image to be marked (which may be light or dark areas).

The software application and laser printing system may provide several advantages. The described systems and techniques may be used with dot-matrix-based laser printers, vector-based laser printers, or other types of laser printers. The software application allows users to select and adjust the resolution of graphic images in numerous ways to meet desired applications. For example, the software application can allow a user to select laser dot placement and density. Also, the software application need not require a special graphics program and may be used with many existing third party graphic creation applications.

An aspect relates to a method of filling an area of an image marked on a product using a laser, such as a continuous wave laser. The image includes at least one marking area and at least one non-marking area. Each marking area includes a set of substantially concentric outlines. Each outline includes a set of points. The laser can generate a laser beam that dwells at each point, according to a programmable dwell time, to alter a visible optical characteristic of the product. For example, the dwell time can be set such that the laser beam moves between points without altering a visible optical characteristic of the product between points, the laser beam dwells at each point longer than the laser beam moves between consecutive points, and the laser beam is incident on the material until the image is completely formed on the product. Alternatively, the dwell time can be set such that the laser beam approximates a vector-based laser printing system.

Another aspect relates to a method of converting a first image into a second image to be marked on a surface by a laser, such as on a surface of a product (e.g., the product item itself, the packaging for the product item or a label for the product item). The method can include: receiving a first image including a plurality of pixels, where the first image has one or more marking areas and non-marking areas; generating a second image that visually approximates the first image, where the second image includes a set of substantially concentric outlines for each marking area in the first image, each outline including a set of points; and using the laser to mark the second image on the product.

Another aspect relates to a system to convert a first image into a second image to be marked on a surface of a product by a laser. The system includes one or more data processing machines, such as a computer, and a laser coupled with the one or more data processing machines. A computer can execute a software application stored on a machine-readable medium to receive a first image including a plurality of pixels. The first image has one or more marking areas and non-marking areas. The application generates a second image that resembles the first image. The second image includes a set of substantially concentric outlines for each marking area in the first image. Each outline includes a set of points. The laser marks the second image on the surface.

According to another aspect, a system and method involves converting an image to a set of locations by defining progressively smaller contours of the image, and marking a material by directing a laser beam according to the locations. Converting the image can involve identifying a set of points that trace boundary pixels of a marking area of the image such that the set of points form a contour of the marking area, removing the boundary pixels from further consideration with respect to defining the contours for the marking area, repeating the identifying and the removing until all pixels of interest in the marking area have been considered, and determining the locations from the identified points.

Identifying the set of points can involve identifying points taken from an image space of higher density/resolution than that of the image, and identifying the set of points can also involve identifying the points based on a programmable tolerance value. Removing the boundary pixels can involve removing pixels from further consideration based on a programmable contour progression factor. The pixels of interest can be defined by a programmable outline only setting. Moreover, determining the locations can involve determining the locations from the identified points based on a programmable step size.

The image can be a generated image formed from a source image based on a programmable intensity threshold. The method can also involve initially removing boundary pixels of the marking area from any consideration based on a programmable pre-erosion value. Marking the material can involve continuously directing the laser beam according to the locations, in an order corresponding to the progressively smaller contours. This can be done using a step-and-repeat, variable dwell time laser printer, which can also be used to mark spots on the material while preventing alteration of a visible optical characteristic of the material in areas traveled by the laser beam between the spots.

Additionally, marking the material can involve directing the laser beam onto a moving product according to the locations, in an order corresponding to the progressively smaller contours and corresponding to times at which the progressively smaller contours enter a laser printing aperture. Moreover, the progressively smaller contours can include overlapping contours (as may result from approximation of idealized contours when determining locations to be marked by a laser).

Details of one or more implementations are set forth in the accompanying drawings and the description below, in which the present systems and techniques are described in connection with a continuous wave laser in a step-and-repeat, variable dwell time laser printing system. It should be appreciated that the image-forming systems and techniques described are equally applicable to other laser printing approaches, including vector-based laser printing. In addition, the terms "dark" and "light" areas are used below to describe "marking" and "non-marking" areas for ease of description, but it is to be understood that a marking area may be dark or light, and a non-marking area may light or dark, in any given application.

Other features and advantages may be apparent from the description and drawings, and from the claims.

BRIEF DESCRIPTION OF THE DRAWINGS

FIG. 3B is a side view of a printing system used in conjunction with a product line which continuously moves a product in front of the printing system.

FIG. 3C is a top view of the printing system of FIG. 3B used in conjunction with a product line which continuously moves the product in front of the printing system.

FIG. 5A is a side view of a printing beam being incident on a material at a location where a spot is to be formed on the material.

FIG. 5B is a perspective view of a printing beam being incident on a material at a location where a spot is to be formed on the material.

FIG. 5C is a side view of a material after the printing beam has formed a spot in the material.

FIG. 5D is a perspective view of a material after the printing beam has formed a spot in the material.

Figure 15B:
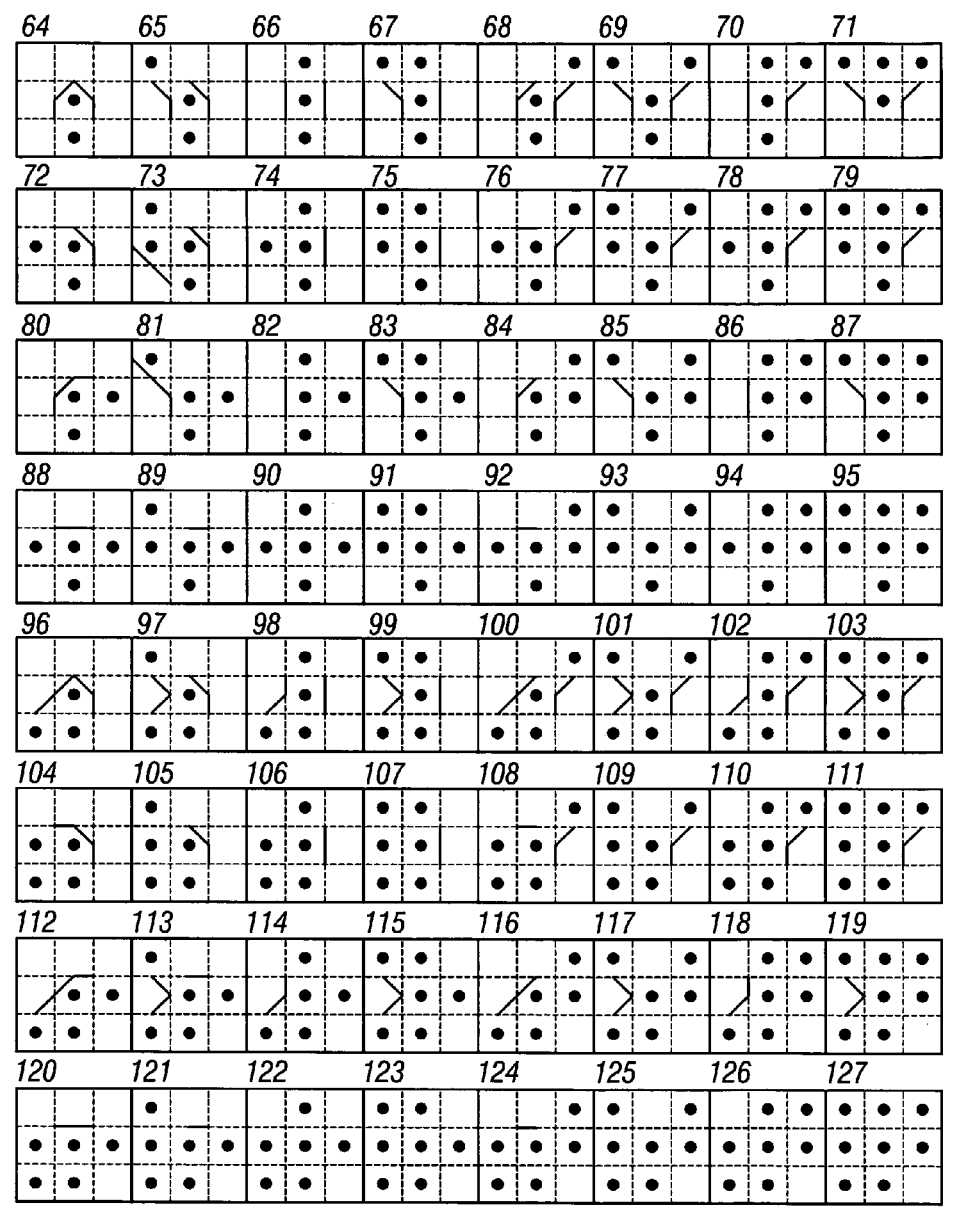
Figure 15D:
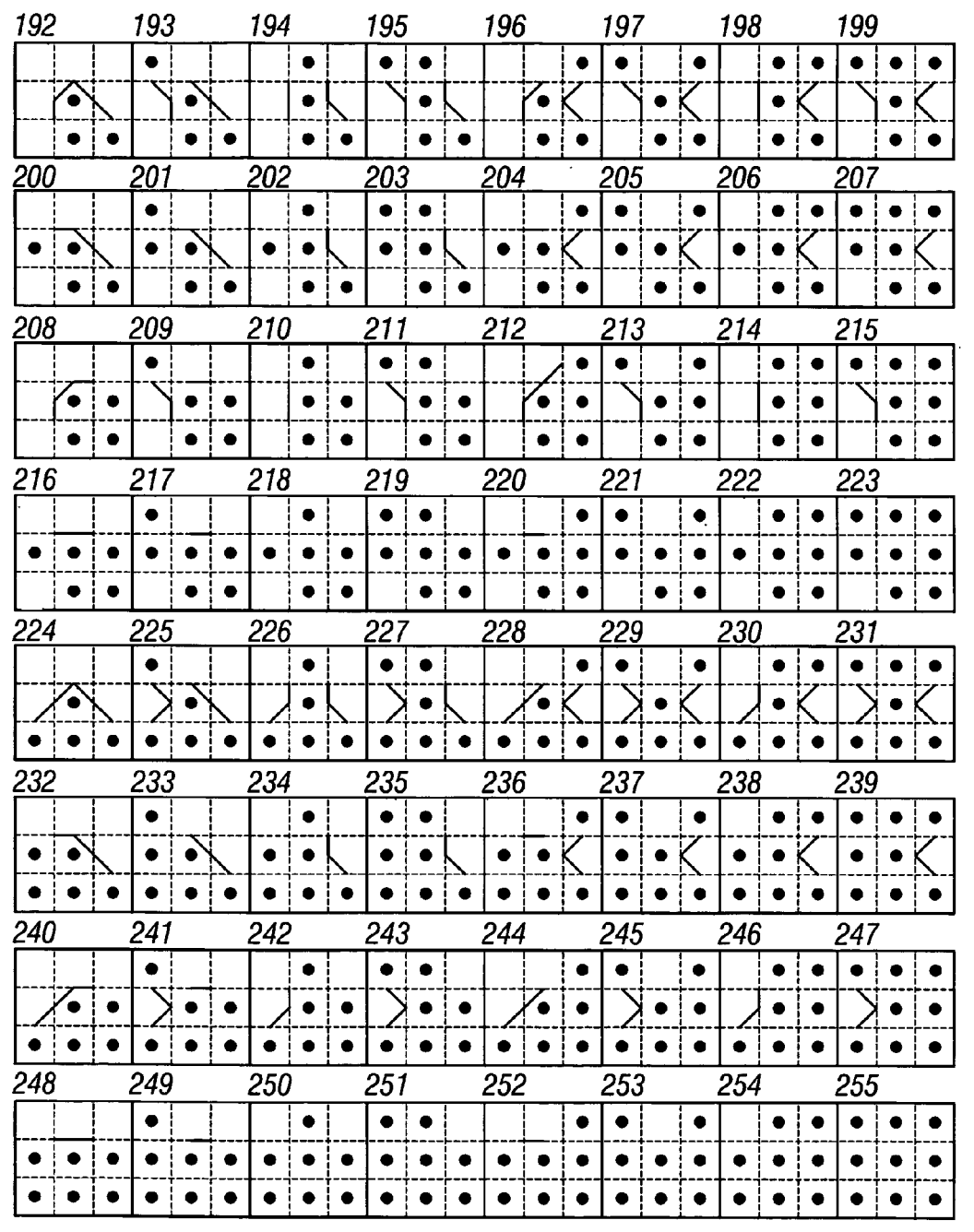

FIGS. 15A–15D illustrate 256 possible combinations of forming line segments for 256 possible combinations of nine pixels of the original image.

DETAILED DESCRIPTION

The present application relates to a printing system for printing an image on a surface, such as a surface of a product (e.g., the product item, its packaging, a label, etc.) positioned adjacent to the printing system. The printing system includes a laser for producing a printing beam. An optics assembly steers the printing beam from one location to another location. The printing system can include electronics for adjusting the time that the printing beam dwells at each location. This dwell time can be adjusted such that the printing beam causes a spot to be formed at each location.

The locations can be arranged such that the spots form an image or graphic, such as a company logo or trademark. The locations can also be arranged to form symbols or codes, which may be part of the image or separate from the image. The symbols may be available in word processing programs such as alphanumeric symbols and any other symbols used to identify a product batch, date, etc. A sequence or code to be printed may include such symbols and can be readable text such as product names or identifiers. The codes to be printed need not be alphanumeric and can include symbols which are not produced by typical word processing programs. For instance, the images, symbols and/or codes produced can include bar codes and complex graphic characters.

Figure 1:
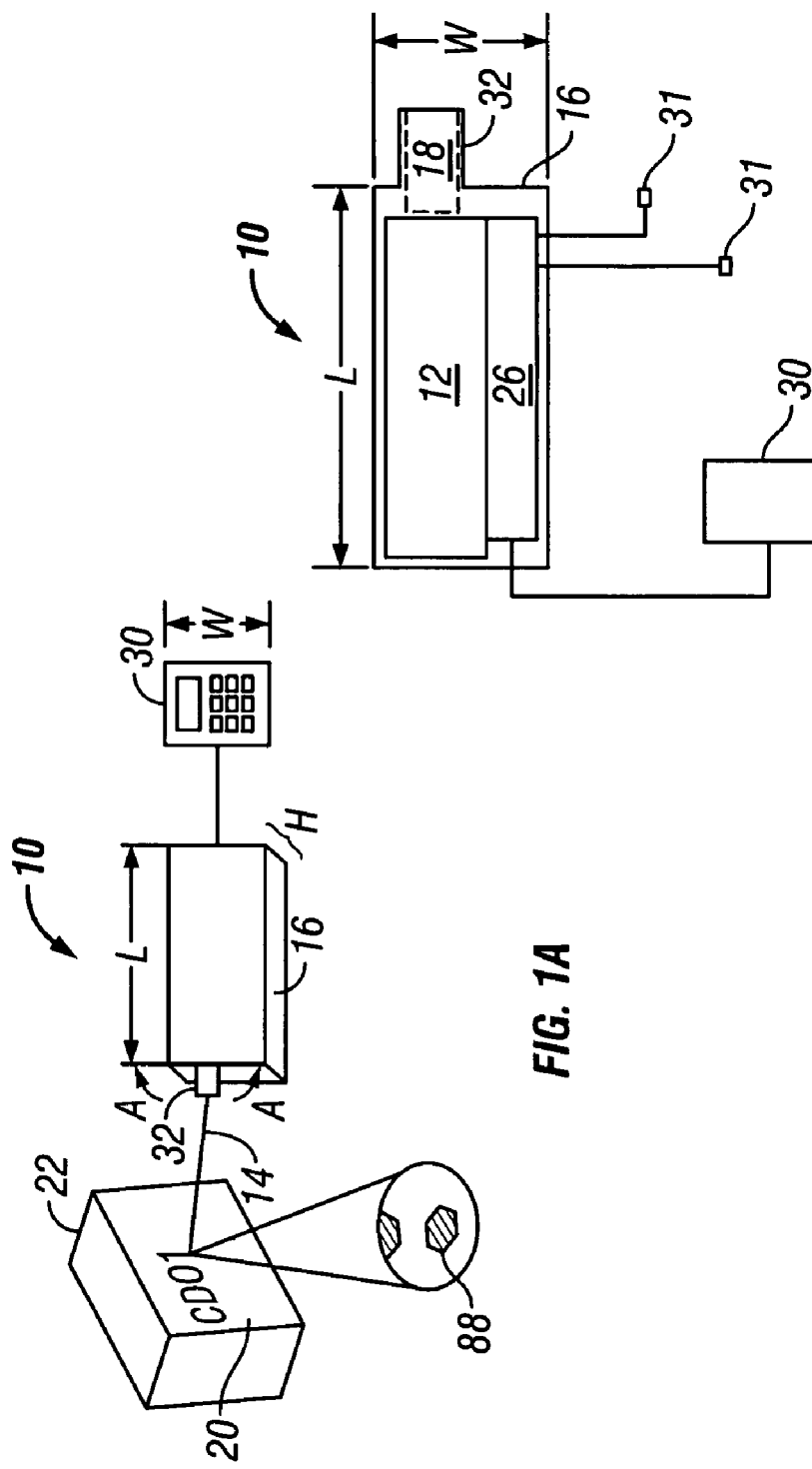
FIG. 1A is a side view of an example printing system.
FIG. 1B is a cross-section of the printing system of FIG. 1A looking down on to the printing system.

FIGS. 1A and 1B illustrate an example printing system 10 for printing on a product 22 positioned adjacent to the printing system 10. FIG. 1A is a side view of the printing system 10, while FIG. 1B is a cross sectional top view of the printing system 10. The printing system 10 includes a laser 12 for producing a printing beam 14. Many types of lasers can be used in the printing system. Since the dwell time can be increased in order to compensate for reduced laser power, a low powered laser can be employed in the printing system. For instance, the laser 12 can be a $CO_2$ air-cooled laser. In some instances, the laser may be a 50-Watt laser, a 30-Watt laser, a 10-Watt laser, or less.

The printing beam 14 from the laser/energy source 12 passes through an optics assembly 18 and is incident on a material 20, such as the material used in product packaging. As will be described in more detail below, the time that the beam 14 is incident on the material 20 can be adjusted such that the beam 14 causes a spot to be formed on the material 20.

The optics assembly 18 includes components for altering the direction of the printing beam 14. These components can be controlled to steer the printing beam 14 from one location to another location so as to create a spot at each of the locations. The spots can be arranged to form one or more images or symbols on the material 20 of the product 22 using the techniques described below.

The printing system 10 also includes electronics 26 in communication with the laser/energy source 12 and the optics assembly 18. The electronics 26 can include one or more processors for providing the functionality to the printing system 10. Suitable processors include, but are not limited to, microprocessors, digital signal processors (DSP), integrated circuits, application specific integrated circuits (ASICs), logic gate arrays and switching arrays. The electronics 26 can also include one or more memories for storing instructions to be carried out by the one or more processors and/or for storing data developed during operation of the printing system 10. Suitable memories include, but are not limited to, RAM and electronic read-only memories (e.g., ROM, EPROM, or EEPROM).

The electronics 26 control the operation of the laser 12 and the optics assembly 18. For instance, the electronics 26 can control the optics assembly 18 to adjust the direction of the printing beam 14, the length of time that the printing beam 14 dwells at a location on the material 20 where a spot is to be formed, the speed that the printing beam 14 moves between each location where the beam dwells, the size of spots used to create visually recognizable symbols/images.

The electronics 26 can optionally be in communication with a user interface 30. The user interface 30 can be remote from the housing 16, attached to the housing 16 and/or detachable from the housing 16. The user interface 30 may be a handheld device. A suitable user interface 30 can include an alphanumeric keyboard and a display. The user interface 30 can be used to program the electronics 26 and/or set printing parameters. For instance, the user interface 30 can be used to manually control the time that the printing beam 14 dwells at a single location on the material 20, the size of the spots used to form a visually observable symbol, the type and/sequence of symbol which are formed, etc. The user interface 30 can also be used to manually activate the printing system 10. For instance, the user interface 30 can include a print key which causes the printing system 10 to print on the material 20.

The electronics 26 can also be in communication with one or more sensors 31. These sensors 31 can provide the electronics 26 with information about the products on which the printing system 10 is to print. For instance, the sensors 31 can indicate the location of a product 22 relative to the printing system 10, the direction that a product 22 is moving, when a moving product 22 has been stopped, and when a product 22 is in the correct position to be printed upon. Suitable sensors 31 (described below) may include, but are not limited to, a speed sensor for detecting the speed and/or direction that a product 22 is moving and a location sensor for indicating when a product 22 is positioned in front of the sensor 31.

The printing system 10 includes a printing beam exit member 32 through which the printing beam 14 exits the housing 16. The printing beam exit member 32 can be as simple as an opening in the housing 16 or an immobile window mounted in the housing 16. In another embodiment, the printing beam exit member 32 can be moved relative to the housing 16 as illustrated by the arrow labeled A. In this embodiment, the printing beam 14 can be manually aimed toward a particular position on the material 20 by manipulating the printing beam exit member 32.

Figure 2:
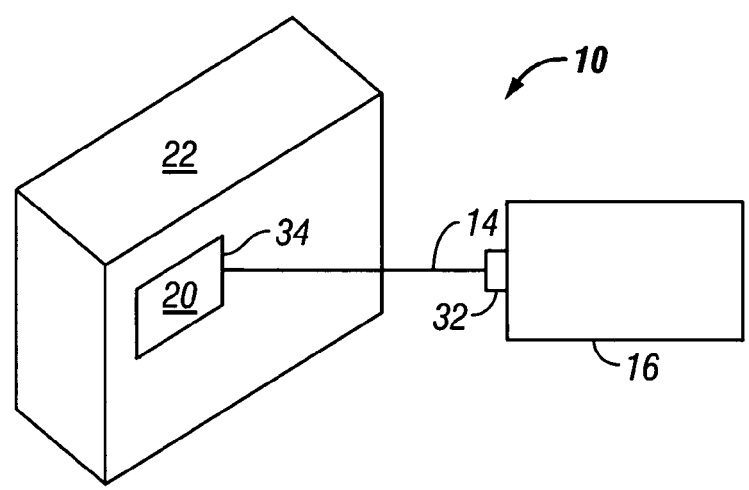
FIG. 2 illustrates the printing system of FIG. 1A forming a print zone upon a product.

FIG. 2 illustrates an example of the printing system 10 forming a print zone 34 upon a product 22. The printing system 10 can include components for defining the print zone 34 on the material 20. For instance, the printing system 10 can project a rectangle onto the material 20 as illustrated in FIG. 2. The printing system 10 forms the symbol of the code within the print zone 34.

During operation of the printing system 10, the print zone 34 may be printed automatically or be controlled by an operator. The operator may adjust the beam outlet member 32 so that the print zone 34 is formed at a desired location on the material 20. The user interface 30 is then used to activate print within the print zone 34. As a result, the operator of the printing system 10 can select where the printing system 10 prints a code on the material 20 by ensuring that the print zone 34 appears in the desired print location. Suitable print zone marks may include, but are not limited to, marks at the four corners of a print zone 34, a mark positioned in the center of the print zone 34, and a dashed line around the print zone 34.

In one embodiment of the printing system 10, the electronics 26 control the size and geometry of the print zone 34. As a result, the electronics 26 can match the size and shape of the symbols to be printed on the material 20. For example, when an unusually large code is to be printed on the material 20, the electronics 26 can enlarge the print zone 34 so the code will be formed entirely within the print zone 34. As a result, an increase in the size of the code will not result in erroneous positioning of the code on the material 20.

Figure 3A:
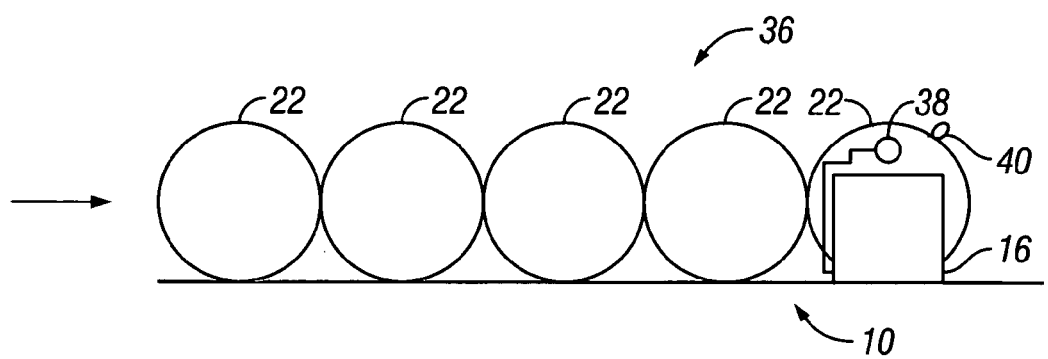
FIG. 3A is a side view of a printing system used in conjunction with a product line which temporarily stops a product in front of the printing system.

FIG. 3A illustrates a side view of the printing system 10 in operation with a product line 36 which temporarily stops the product 22 in front of the printing system 10. The printing system 10 can print on a stationary product 22 or on packaging located on a product line 36 which moves the product 22 relative to the printing system 10. The printing system 10 in FIG. 3A is in communication with a print trigger 38 which detects when one of the products 22 is positioned in front of the print trigger 38. A suitable print trigger 38 includes a device which produces a light beam. The device can be set up next to the product line 36 so that the product 22 disrupts the beam as the product 22 travels along the product line 36. The printing system 10 can monitor the device to determine when a product 22 has disrupted the beam. The print trigger 38 can be positioned such that when it has been triggered, the product 22 is correctly positioned for printing on the product 22. Alternatively, the print trigger 38 can be positioned such that when it has been triggered, a time delay will pass before the product 22 is correctly positioned for printing upon the product 22.

The printing system 10 can also be in communication with a stop mechanism 40, which stops each product 22 in front of the printing system 10. During operation of the product line 36, the stop mechanism 40 is withdrawn to allow the products 22 to move along the product line 36. The movement can result from one or more mechanical forces or one or more natural forces such as gravity. Once the product 22 has moved past the stop mechanism 40, the stop mechanism 40 is moved back into place to block the next product 22.

During operation of the printing system 10 illustrated in FIG. 3A, the products 22 pass before the printing system 10 on the product line 36. The printing system 10 monitors the print trigger 38 to determine when a product 22 has moved in front of the print trigger 38. The printing system 10 waits a pre-set delay to let the product 22 be pressed against the stop mechanism 40 and then prints the symbols on the packaging. As a result, the product 22 remains stationary while the printing system 10 prints the code on the packaging.

Once the code has been printed, the printing system 10 activates the stop mechanism 40 so the product 22 is again able to move. The printing mechanism monitors the print trigger 38 to find a gap between products 22. Once a gap is found, the printing system 10 activates the stop mechanism 40 to stop the next product 22 and again monitors the print trigger 38 to detect when the next product 22 has moved in front of the print trigger 38.

FIGS. 3B and 3C illustrate the printing system 10 in use with a product line 36 which continuously moves the product 22 past the printing system 10. The products 22 can be evenly or sporadically spaced on the line. The printing system 10 is in communication with a print trigger 38 and a speed sensor 42. The electronics 26 (FIG. 1B) can use signals from the speed sensor 42 to determine the speed and direction of the products 22 on the product line 36. Suitable speed sensors include, but are not limited to, encoders and resolvers.

While setting up the printing system 10, the distance between the printing system 10 and the print trigger 38 can be administratively entered into the electronics 26. In an alternative embodiment, the print trigger 38 is attached to the housing 16 so as to provide a fixed and known distance between the print trigger 38 and the printing beam 14. In this embodiment, the distance is known to the electronics 26 and does not need to be administratively entered.

During operation, the printing system 10 monitors the print trigger 38 to determine when a product 22 has moved in front of the print trigger 38. When it determines that a product 22 has moved in front of the print trigger 38, the printing system 10 determines the speed of the product 22 on the line 36 and uses this speed to determine a code position time delay. The code position time delay is determined such that the code is printed at a desired position on the product 22. A suitable method for determining this code position time delay is discussed below. Once the determined code position time delay has passed, the symbols are printed as the product 22 moves past the printing system 10.

Once the code is printed, the print trigger 38 may determine when the product 22 has moved past the print trigger 38. In one embodiment, the print trigger 38 is always monitoring to identify when a new product 22 has moved in front of the print trigger 38. As shown in FIG. 3B, the print trigger 38 can be triggered by one product 22 while the printing system 10 is printing on another product 22. Hence, the printing system 10 may track the time delay for one of the products 22 while printing on another product 22. These situations can be handled with standard multi-task programming.

The printing system 10 can be used with other product lines 36. For instance, some product lines 36 include a labeling station for applying a label to a product 22. A labeling station typically includes electronics for determining when each product 22 has the label applied. The printing system 10 can be in communication with the labeling station and can print the code on each label after it has been applied to the product 22. The printing of the code can be triggered by the electronics within the label station. For instance, when the electronics of the label station detect that a label has been applied, these electronics can provide the printing system 10 with a signal indicating that the code should be printed.

Figure 4A:
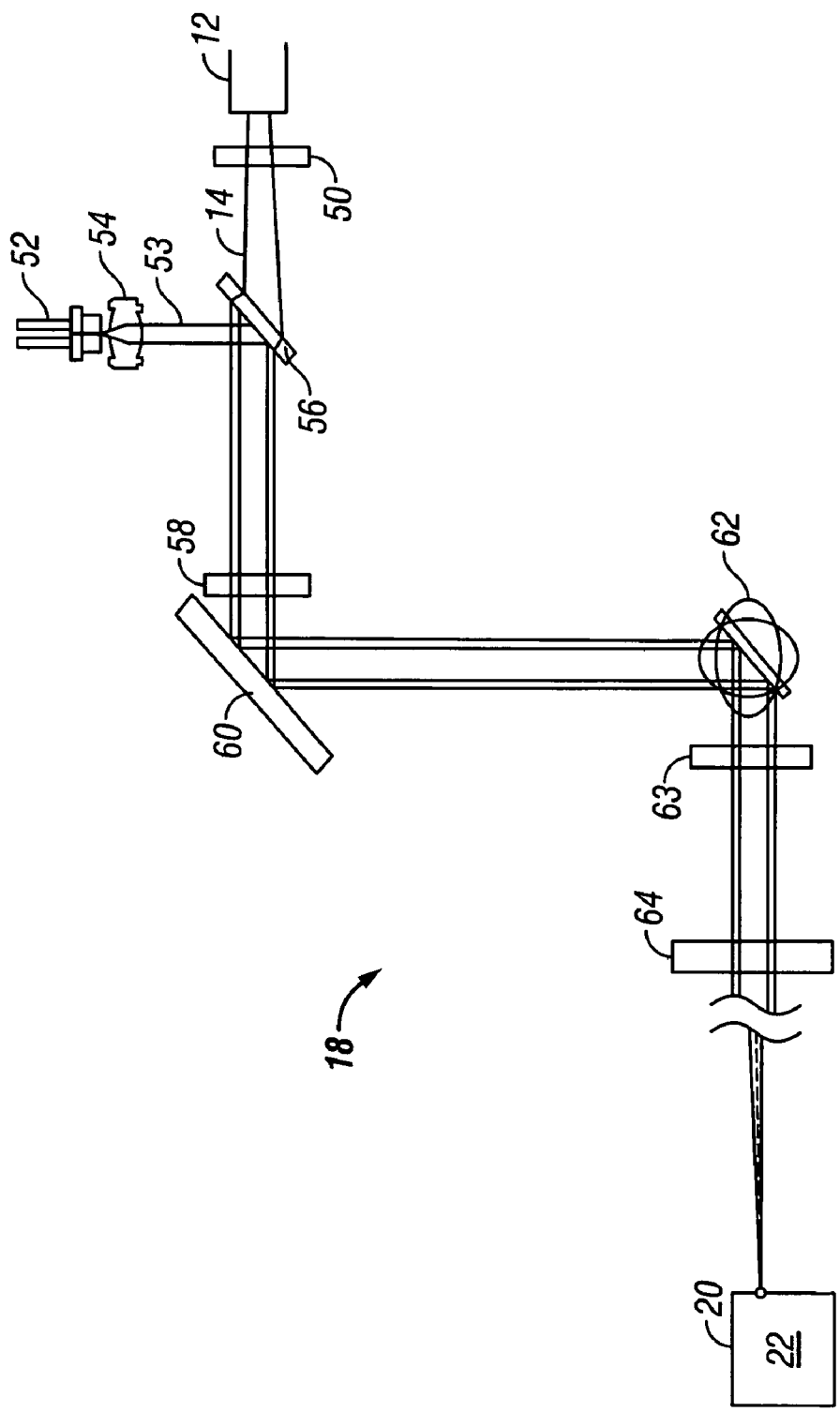
FIG. 4A illustrates an example optical assembly for use in the printing system of FIG. 1A.

FIG. 4A illustrates a top view of an optics assembly 18 in the printing system 10. The optics assembly 18 includes the laser source 12 for producing the printing beam 14. The printing beam 14 passes through a first negative lens 50, which expands the printing beam 14. The optics assembly 18 also includes a print zone light source 52 for producing a print zone beam 53, which passes through a second negative lens 54, which expands the print zone beam 53. Although the printing beam 14 and the print zone beam 53 are illustrated as being concurrently produced, the electronics 26 (FIG. 1B) can cause them to be produced independent of one another. Further, the print zone beam 53 is optional and need not be included in the optics assembly 18.

The printing beam 14 and the print zone beam 53 are combined at a beam combiner 56. The combined beams pass through a positive lens 58, which collimates the beams before they are turned at a reflector 60. The combined beams then pass to a plurality of mirrors 62 which reflect the combined beams toward a second positive lens 63, which focuses the combined beams. The combined beams then pass through a protective window 64 before passing to the product 22.

Figure 4B:
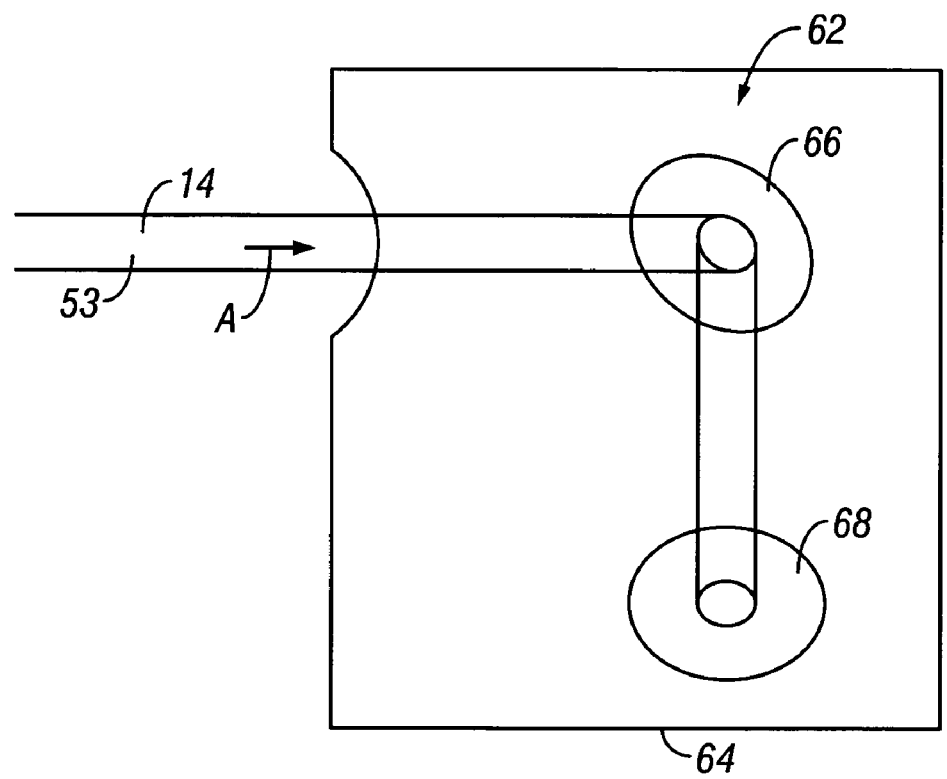
FIG. 4B is a side view of a plurality of mirrors of FIG. 4A configured to steer a printing beam produced by the printing system from one location to another on a product where a code is to be formed.

Because FIG. 4A is a top view of the optics assembly 18, and the mirrors 62 are positioned on top of one another, the arrangement of the mirrors 62 is not apparent from FIG. 4A. In order to clarify the arrangement of the mirrors, FIG. 4B provides a side view of the optics assembly 18 looking through the protective window 64. The combined beams 14, 53 approach the mirrors 62 from the left as illustrated by the arrow labeled A. The beams 14, 53 are reflected off a first mirror 66 down toward second mirror 68. The combined beams 14, 53 are reflected from the second mirror 68 out of the page.

Figure 4C:
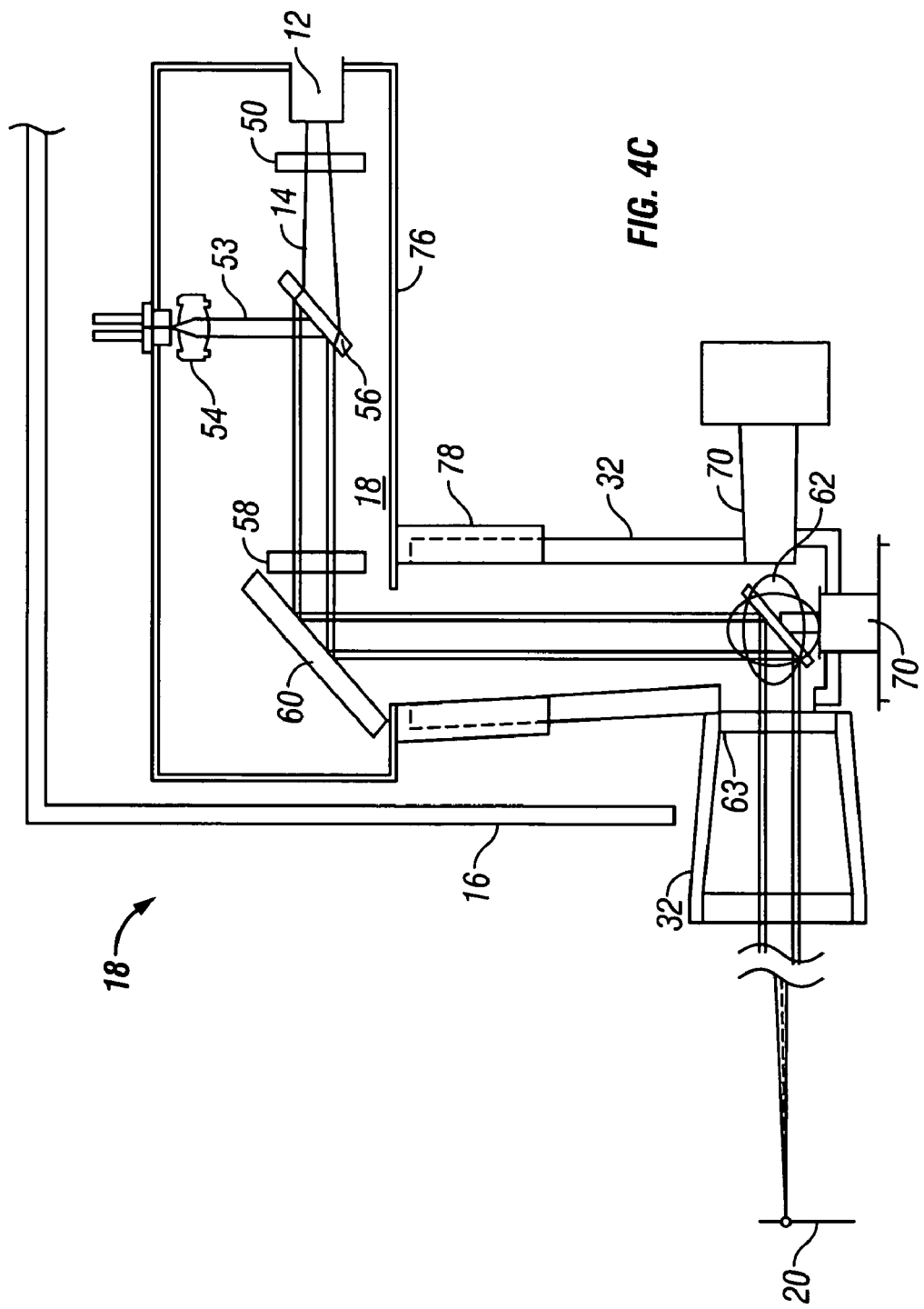
FIG. 4C illustrates the relationship between an optics assembly and a housing of the printing system of FIG. 4A.

As illustrated in FIG. 4C, one or both of the mirrors 62 can be coupled with a one or more actuators 70 for moving the mirrors 62. Suitable actuators 70 include, but are not limited to, micromotors. The actuators 70 are controlled by the electronics 26 (FIG. 1B) to steer the beams 14, 53 to form symbols and the print zone 34 on the packaging. For instance, when the print zone 34 has a rectangular shape, the print zone beam 53 can trace a rectangle around the print zone 34 at a speed which causes the rectangle to appear solid to the human eye or at about 100 cycles/second.

Figure 4D:
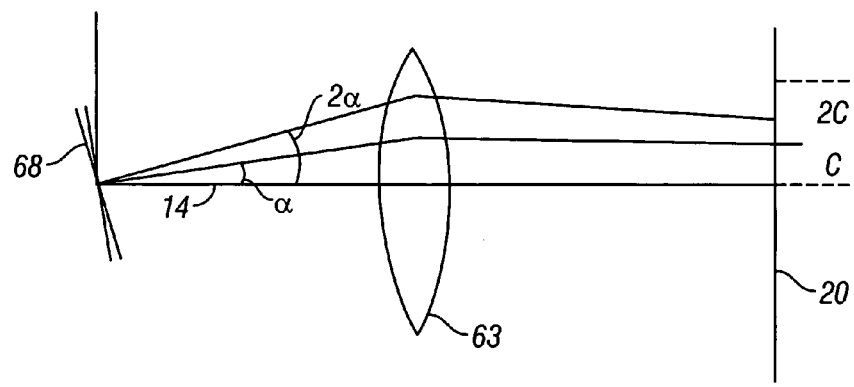
FIG. 4D illustrates the non-linear nature of a lens used in the optics assembly of FIG. 4A.

The second positive lens 63 of FIG. 4A can be a non-linear lens. FIG. 4D illustrates the second mirror 68 in a first position and a second position. In the first position, the angle between the printing beam 14 and a lens axis is $\alpha$, while in the second position this angle is doubled to $2\alpha$. Due to the non-linear nature of the lens 63, the printing beam 14 is incident on the product 22 at a distance, C, from the lens axis when the second mirror 68 in the first position. However, when the second mirror 68 is in the second position, the printing beam 14 is not incident on the product 22 at a distance, 2C, from the lens axis despite the angle being increased to $2\alpha$. The lack of proportionality between the movement of the mirror 68 and the movement of the printing beam 14 results from the non-linear nature of the lens 63.

The electronics 26 (FIG. 1B) can include logic which corrects for the effects of non-linearity of the second positive lens 63. Accordingly, this logic would cause the second mirror 68 to increase the angle by more than 2α in order to move the printing beam 14 by 2C. The correction logic can be developed from theoretical optical equations providing a relationship between α and C for the second positive lens 63. Alternatively, the correction logic can be developed from experiments performed to determine the relationship between α and C. This correction logic eliminates the need for an expensive and large F-θ lens which is typically used to correct for non-linearity. Accordingly, this correction allows the size and cost of the printing system 10 to be reduced.

The effects of spherical aberration can be corrected with the variable dwell time. For instance, the dwell time may be increased when the effects of aberration are apparent on the product 22.

During operation of an optics assembly 18 including a printing zone light source 52, the print zone light source 52 is activated and the laser 12 is deactivated. The mirrors 62 are moved such that the print zone 34 is formed on the product 22. When the symbols are to be formed on the packaging, the print zone light source 52 is disengaged, and the laser/energy source 12 engaged until the symbols are formed. Once the symbols are formed, the laser/energy source 12 can be disengaged and the print zone light source 52 engaged in order to continue with formation of the print zone 34.

Figure 4E:
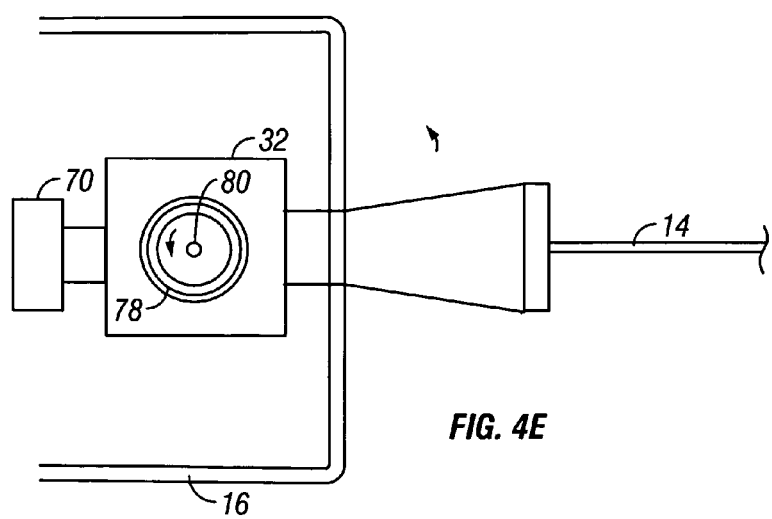
FIG. 4E illustrates a bearing of FIG. 4B which allows a printing beam exit member of the printing system to be rotated relative to a housing of the printing system.

As discussed above with reference to FIG. 1B, the printing system 10 can include a printing beam exit member 32 which can be moved relative to the apparatus housing 16. FIGS. 4C and 4E illustrate the mechanical arrangement which permits this movement of the printing beam exit member 32. A frame 76 in FIG. 4C supports the printing beam exit member 32 within the housing 16. A bearing 78 positioned between the frame 76 and the printing beam exit member 32 allows the printing beam exit member 32 to move relative to the frame 76. FIG. 4E provides a cross-sectional side view of the bearing 78 looking along the printing beam 14. The printing beam 14 passes through the bearing 78 (FIGS. 4C and 4E) along the axis of rotation 80 permitted by the bearing 78 (FIG. 4E), is reflected by the mirrors 62 (FIG. 4C) and passes through the end of the exit member 32 (FIGS. 4C and 4E). Hence, movement of the printing beam exit member 32 relative to the frame 76 does not change the position of the printing beam 14 relative to the bearing 78.

As illustrated in FIGS. 4C and 4E, the mirrors 62 and the actuators 70 are coupled with the printing beam exit member 32. As a result, the mirrors 62 and the actuators 70 move with the printing beam exit member 32 as the printing beam exit member 32 is moved relative to the housing 16. Further, a portion of the first mirror 66 (FIG. 4B) is positioned along the bearing's axis of rotation 80 (FIG. 4E). Hence, movement of the printing beam exit member 32 does not alter the angle of incidence between the printing beam 14 and the first mirror 66. Accordingly, when the printing beam exit member 32 is moved relative to the housing 16, the first mirror 66 still directs the printing beam 14 toward the same portion of the second mirror 68, and the printing beam 14 still exits the housing 16 through the same portion of the protective window 64. The rotatability of the printing beam exit member 32 relative to the housing 16 allows the printing beam 14 transmitted through the printing beam exit member 32 to be aimed at various positions on the product 22.

As described above, the printing beam 14 forms a plurality of spots at a variety of locations on the product 22 by remaining at the location until an optical characteristic of the location is altered. For illustrative purposes, FIGS. 5A–5D illustrate formation of a spot on a product 22 by removing a layer of ink from the product 22. FIGS. 5A and 5B illustrate the printing beam 14 incident on the material 20 at a particular location before a spot 83 (FIG. 5C) is formed on the material 20. The material 20 includes a substrate 82 such as paper. An ink layer 84 is formed on the substrate 82. The ink layer 84 can include several different ink types as well as several different colors as is apparent from the labels of many commercially available products 22. The material 20 illustrated in FIG. 5A includes an additional layer 86. The additional layer 86 represents the one or more layers which are often present over the ink layer 84 on product packaging. For instance, many materials 20, such as dog food bags, include a wax layer over the substrate 82 and ink layers 84.

FIGS. 5C–5D illustrate the material 20 after the spot 83 has been formed at the particular location on the material 20. The time that the printing beam 14 dwells at the particular location is adjusted such that the printing beam 14 has ablated the ink layer 84 and the additional layer 86 from the material 20 without burning the substrate 82. As a result, the substrate 82 is seen at the particular location on the material 20. The time to ablate an ink layer 84 is typically 100–500ls.

The time to form the spot 83 is often a function of the materials 20 in the layers. For instance, the additional layer 86 can be a wax layer which protects the packaging and gives it an attractive appearance. Forming a spot 83 through such layers often requires more time than is required by the ink layer 84 alone.

The present application includes adjusting the time that the printing beam 14 dwells at a location such that a spot is formed at the location. In some instances, the dwell time is greater than 50 $\mu$s, such as 100 $\mu$s, 200 $\mu$s, 50–50,000 $\mu$s, 100–500 $\mu$s or 200–500 $\mu$s. In some instances, the diameter of the spot is less than 400 $\mu$m, less than 250 $\mu$m or less than 170 $\mu$m.

The systems and techniques described above in connection with FIGS. 1A–5D are for illustration purposes only. The systems and techniques described below regarding using concentric outlines to fill a graphic image marked by a laser can be used with any type of laser printing system, such as those provided by Markem of Keene, N.H. and Laserlnk Corporation of San Diego, Calif. For example, the laser printing system used can employ the systems and techniques described in U.S. Pat. No. 6,791,592, issued Sep. 14, 2004, and entitled "Prining a Code on a Product", U.S. patent application Ser. No. 10/890,069, filed Jul. 12, 2004, and entitled "Laser Marking User Interface", U.S. patent application Ser. No. 10/693,356, filed Oct. 24, 2003, and entitled "Low Angle Optics and Reversed Optics", U.S. patent application Ser. No. 10/741,930, filed Dec. 19, 2003, and entitled "Striping and Clipping Correction", all of which are hereby incorporated by reference.

Figure 6:
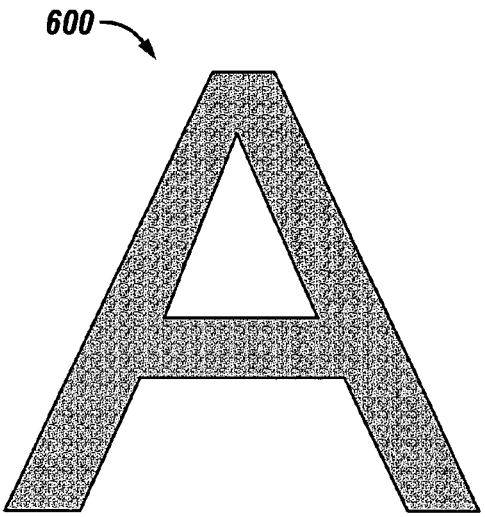
FIG. 6 illustrates an original image, such as a bitmap image, which a user desires to mark on a product or product container with a laser printing system, such as that of FIG. 1A.

FIG. 6 illustrates an original graphic image 600, which a user desires to mark on a product or product container. The image 600 may be stored as a bitmap file. A graphics application described below can convert dark areas of the original image 600 into a set of concentric lines, as shown in FIG. 7, which are made up ordered locations useable to direct a laser printing beam.

Figure 7:
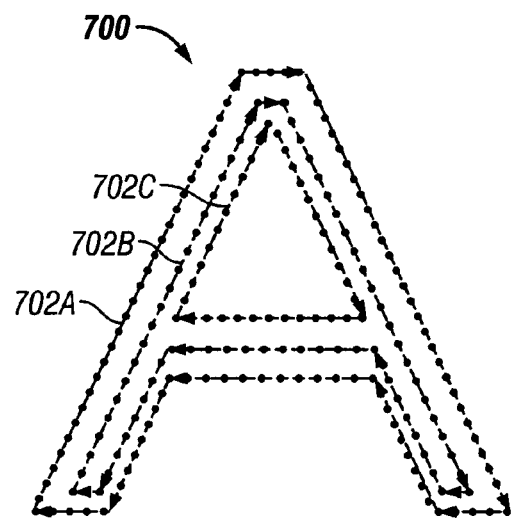
FIG. 7 illustrates a converted image to be marked on a product with a laser printing system, such as that of FIG. 1A.

FIG. 7 illustrates a converted image 700 to be marked on a product. The graphics application uses concentric outlines 702A, 702B, 702C of designated points (every Nth point) to fill dark areas of the original image 600. The designated points and outlines 702A–702C may be spaced close together and the actual printed image may be small (e.g., quarter of an inch) such that the actual dark area of "A"

printed appears substantially solid to the human eye. These outlines 702A–702C follow the contour of the image and reinforce the visual appearance of the image.

The outlines 702A–702C can be formed on a product using a laser, including potentially using a step-and-repeat process and variable dwell time as described. The laser can be operated in a continuous wave mode and can remain on between designated points and between outlines 702A–702C. This can reduce the size of the data set for the converted image 700 and the number of times the laser switches on and off. Among other benefits, leaving the laser on until an image is completely formed may eliminate delays that would otherwise occur between consecutive vectors used in cross-hatching. However, as mentioned previously, the concentric outlines approach to marking an image on a product can be used with vector-based laser printers as well.

Figure 8:
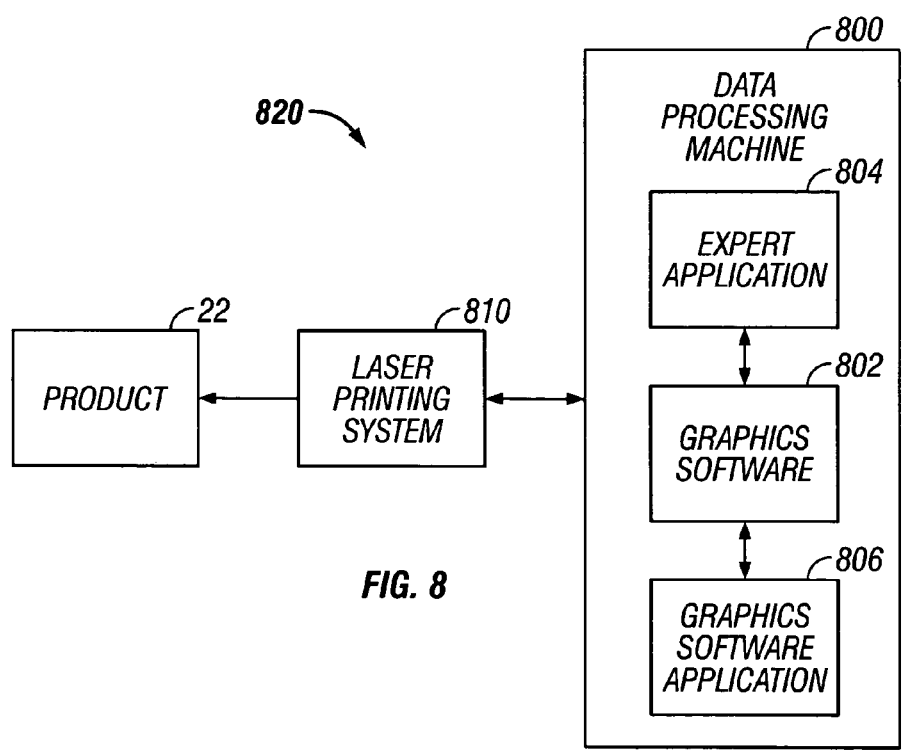
FIG. 8 illustrates an example image printing system, including a data processing machine, a laser printing system and a product to be marked.

FIG. 8 illustrates an example image printing system 820, including a data processing machine 800, a laser printing system 810, and a product 22 to be marked. The data processing machine 800 may be a personal computer (PC), a laptop or other type of computer with a processor, memory, a hard drive, a display and input components, such as a keyboard and mouse. The data processing machine 800 may include one or more graphics software applications 806, such as Microsoft Paint™, a Windows®-based graphics software 802 (hereinafter "software 802"), and another software application 804, which is used to transfer laser printable images to the laser printing system 810. The software application 804 can be a custom device interface application for a family of laser printer products, such as the Expert™ application available from Markem of Keene N.H. and LaserInk Corporation of San Diego, Calif. The graphics software application(s) 806 can be used to create and edit images (e.g., bitmaps). The software 802 can convert an original image, such as the image 600, into a printable image, such as the image 700, which may be stored locally at the printing system 810. The software 802 may be stored on a machine-readable medium, such as a hard drive, a disk, or memory. The software 802 may be incorporated into a printer driver, such as a Microsoft Windows® printer driver. It is to be appreciated that the functional operations described can be incorporated into multiple software products, such as those described, or in a single software product, and multiple operating systems may be used as well.

The laser printing system 810 may be a SmartLase I, 110, 130 or other laser system available from LaserInk Corporation of San Diego, Calif. The laser printing system 810 may have a laser aperture of 2"×4", a spot size of 0.008" and a minimum step time of 150 $\mu$seconds. Laser wavelengths and powers may determine the materials that can be marked with images. The laser-based image printing system 820 may use the software 802 to mark any symbol, code, sequence, logo, image or pattern on a product 22. For example, the system 820 may successfully mark corporate logos, such as Ford and Volkswagen, Asian characters, such as Chinese and Japanese characters, specialized symbols, such as recycling categories, etc.

Additionally, the system 820 can employ a user interface system in which a first software application at a computer creates and edits fonts, the computer sends the fonts to the laser electronics, and the laser electronics use the fonts to convert text data to images for the laser to print. A second application at the computer can create and edit menu screen bitmaps. The computer can send the menu screen bitmaps to the user interface device to display. A third application at the computer can create and edit a keyboard function map for the user interface device. The computer can send the keyboard function map to the user interface device. A user may use the user interface device to edit images for the laser to print and control operation of the laser.

Figure 9:
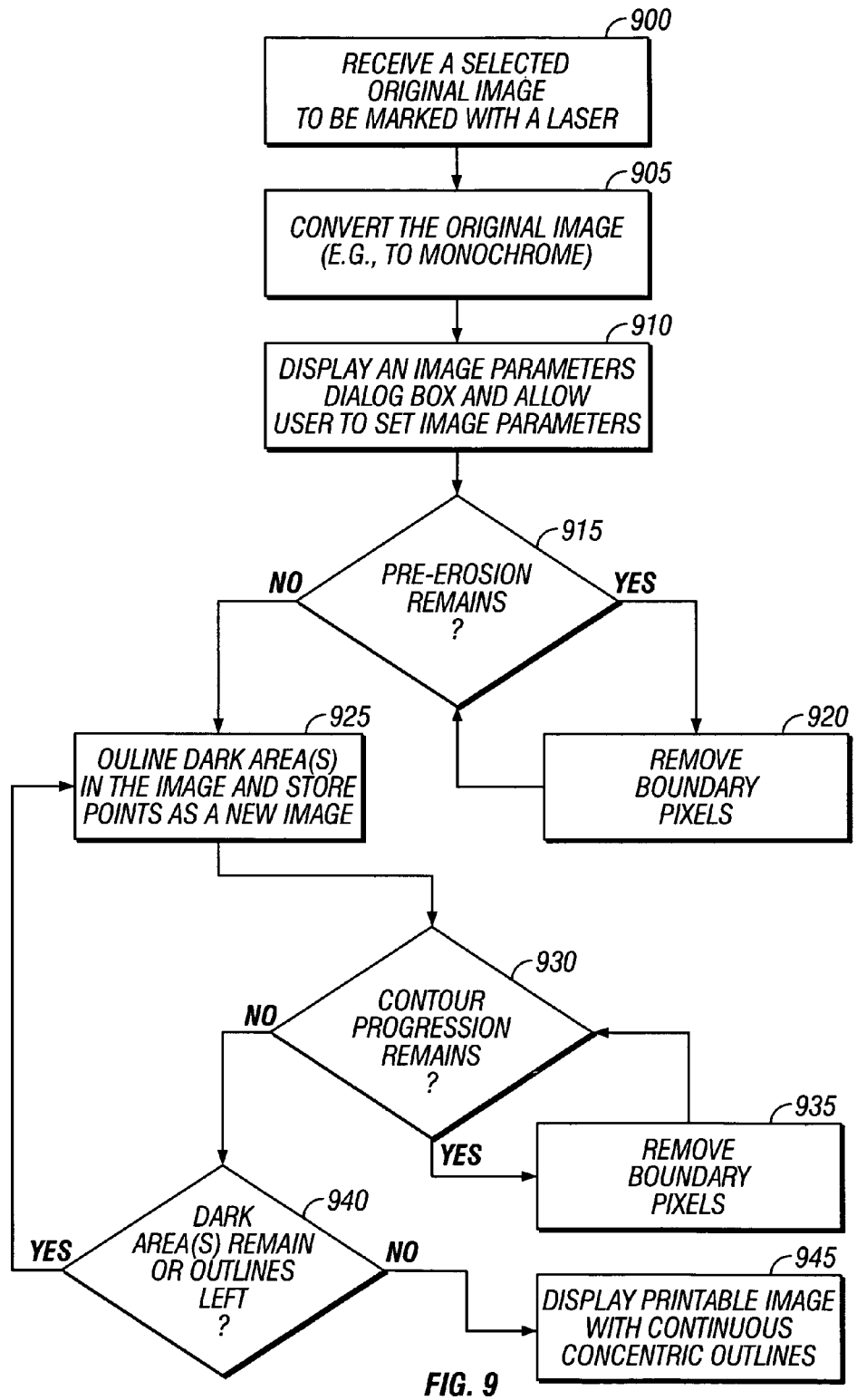
FIG. 9 illustrates a technique of using concentric outlines to fill a graphic to be marked.

FIG. 9 illustrates a technique of using concentric outlines to fill a graphic to be marked by the system 820 of FIG. 8. The user prepares an image using a graphics application 806. Microsoft Windows® supports a variety of graphic formats and programs to manipulate images. Users can choose from dozens of applications, such as Adobe Illustrator®, Paintbrush and Microsoft Paint™, to acquire, create, and manipulate images. Most graphics applications, such as Microsoft Paint™, can save and export files in bitmap (".bmp") format. Any image that can be viewed on a PC screen can be captured and saved in this ".bmp" format with Microsoft Paint™. The user can use many graphics applications to manipulate the scale/resolution of bitmap images. Examples include IrfanView, a shareware application available for download at www-irfanview-com, and Microsoft Paint™.

The user may open the software 802, which can start with a file selection dialog window. The user can navigate to the file containing the desired image and select the file; the software 802 receives the selected original image to be marked with a laser at 900. The software 802 can display the contents of the selected file as a dark and light (i.e., black and white or monochrome) bitmap, as shown in FIG. 10A.

Figure 10A:
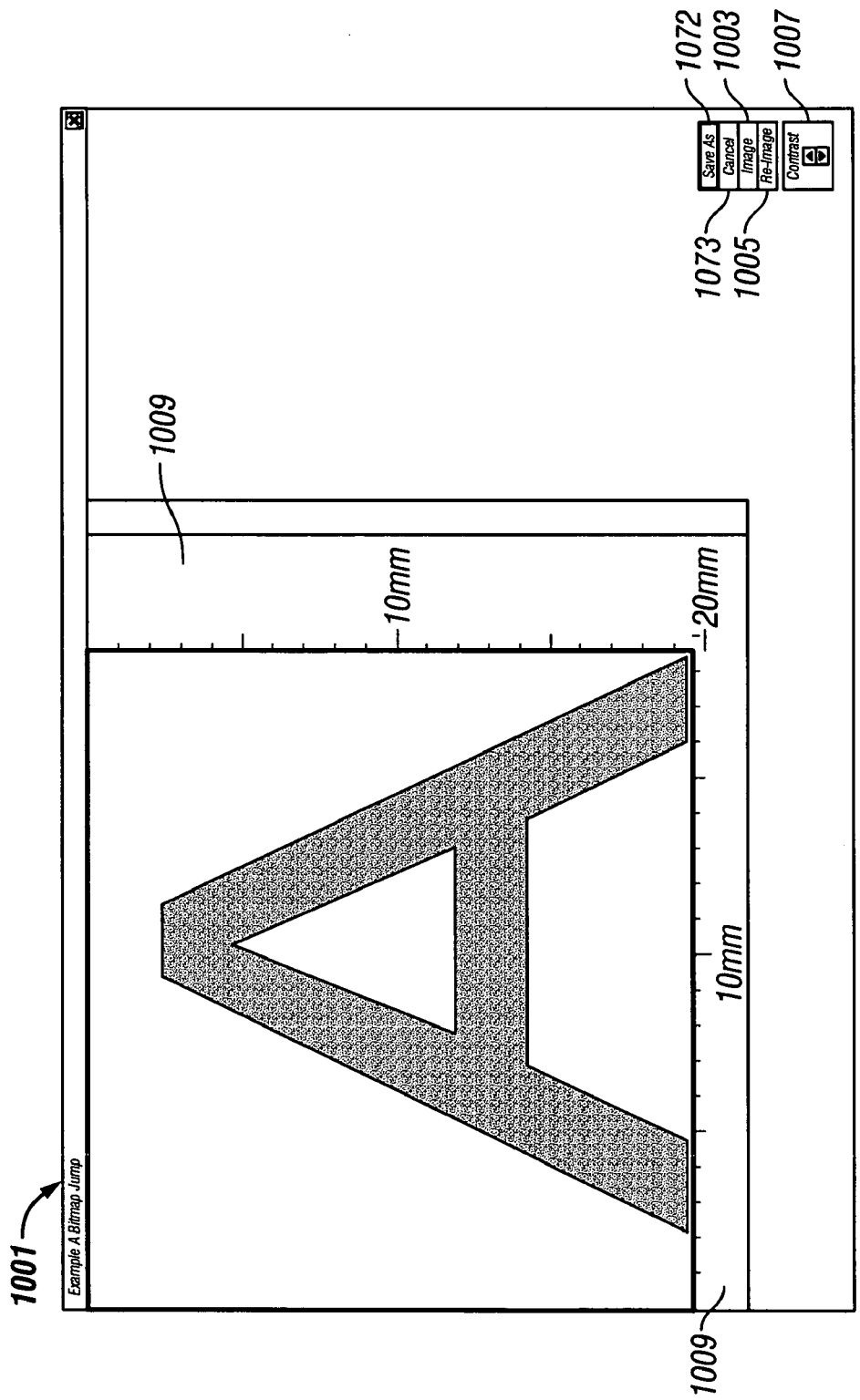
FIG. 10A illustrates an example of an image loaded into the software.

FIG. 10A illustrates an example of an image 1001 loaded into the software 802. Horizontal and vertical rulers 1009 allow the user to estimate the size of the image to be marked. The scale of the rulers 1009 may be based on a size of the aperture (described above). The software 802 may expect a Windows® bitmap image with a file extension of ".bmp" and expect the bitmap to be properly scaled as desired by the user. The user can calculate the desired resolution by knowing the full aperture of the laser, which can include 4096×4096 addressable points (described below), and the largest image the user can process with some graphics applications is 1024×1024 pixels. Starting with the highest resolution image and using the minimum output scaling would generally give the best results.

If the original image is in color, the software 802 can convert the original image to monochrome at 905. Specifically, the software 802 can resolve the original image into areas to mark and areas to not mark. The laser marks the dark (black) areas, avoiding the light (white) areas of the monochrome image. Color bitmaps can be converted to monochrome using an intensity threshold. Pixels of the original image with intensities below the threshold can be forced to dark and those above the threshold can be forced to light. The software 802 can provide a contrast spin control 1007 to allow the user to adjust the intensity/color conversion threshold. Each time the user presses the contrast spin control 1007, the software 802 can reprocess and redisplay the entire image to the user. Increasing contrast raises the threshold so that more of the original image becomes dark. Lowering the contrast lowers the threshold so that more of the original image becomes light.

If converting a color bitmap does not produce a desirable monochrome image, one of the graphics applications 806 mentioned above may be used to edit the image. Manipulating the color map of the original image, including potentially inverting the color map, may be useful in obtaining an image that results in a quality laser print having a desired appearance.

Figure 10B:
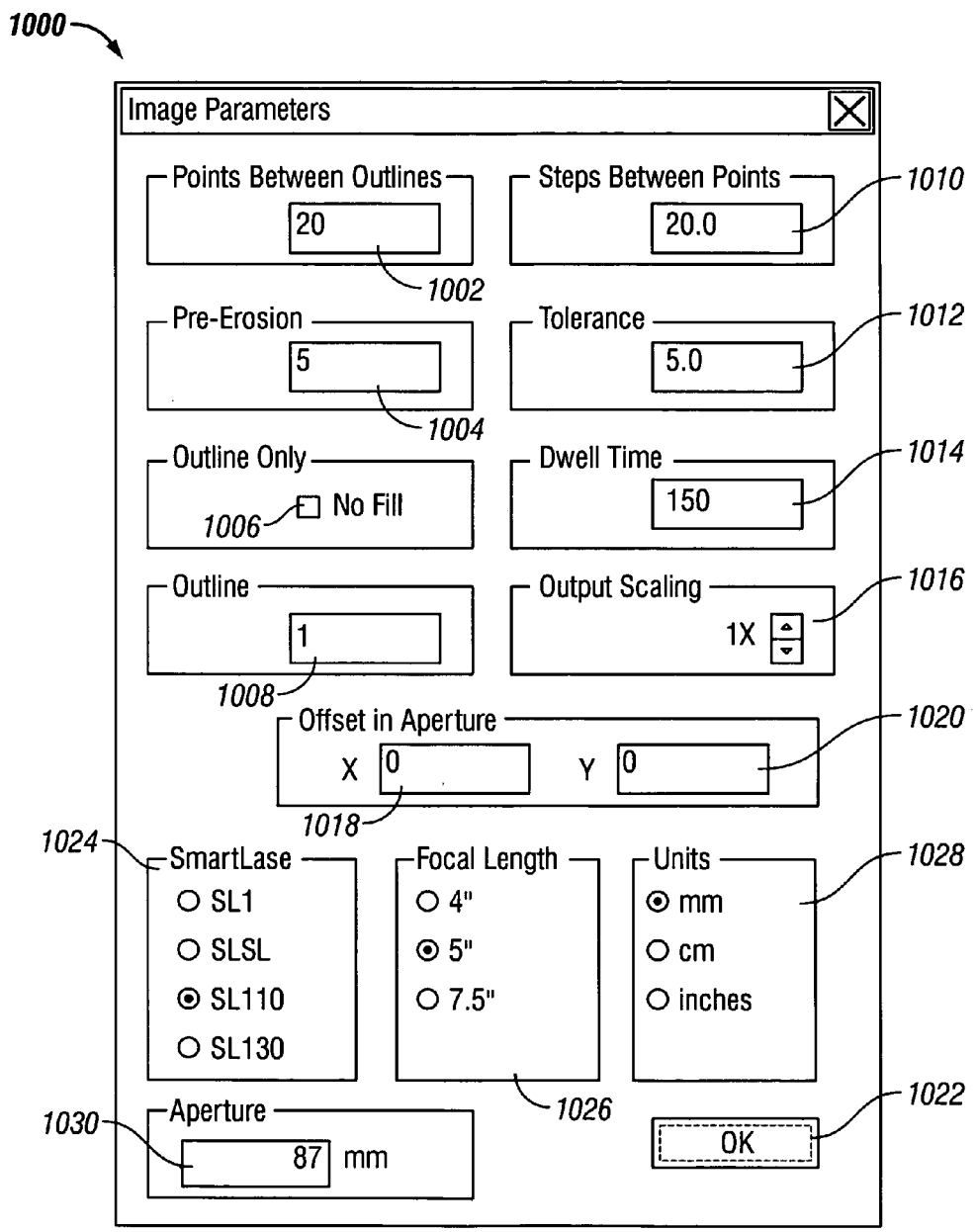
FIG. 10B illustrates an Image Parameters dialog box.
Figure 10C:
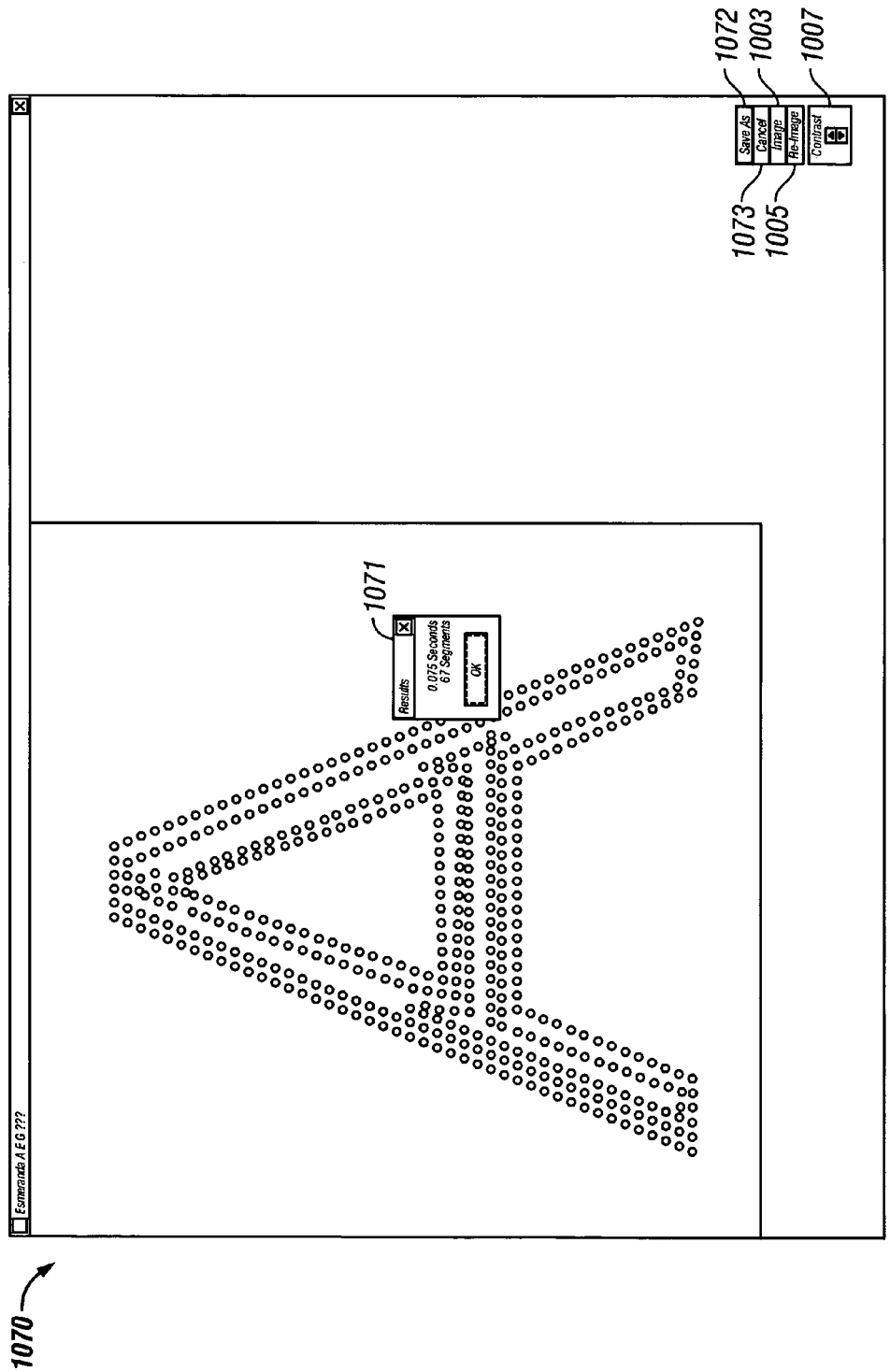
FIG. 10C illustrates a black image displayed against a dark gray background and a results box.

Once the user achieves an acceptable threshold and has a desired monochrome image, the user is ready to select image parameters. The user clicks on an Image button 1003, and the software 802 displays an Image Parameters dialog box 1000 (FIG. 10B) at 910. The Image Parameters dialog box 1000 allows a user to select a number of parameters. The parameters may be in units of points, except Dwell Time 1014, which is in units of time (e.g., microseconds).

Pixels, points and spots are now described. The original image (e.g., the image 600, which may be a bitmap) has a plurality of small light and dark pixels. An original image of pixels is converted to a new image of points, as described below. Digital-to-analog converters in the electronics of the laser unit may be configured to address points, which correspond to possible locations on a product material where the laser beam will dwell to form visible spots. For example, digital-to-analog converters in the electronics 26 of the laser unit 12 may address an area on a product to be marked as a two-dimensional space of 4,096×4,096 addressable points, where point (2048, 2048) is close to the center of a laser aperture. The laser may not be able to reach some of the 4,096×4,096 points because a physical aperture of the laser may be circular, and the corners may thus not be markable. Corner points of the screen may clip because of a circular aperture.

Figure 16:
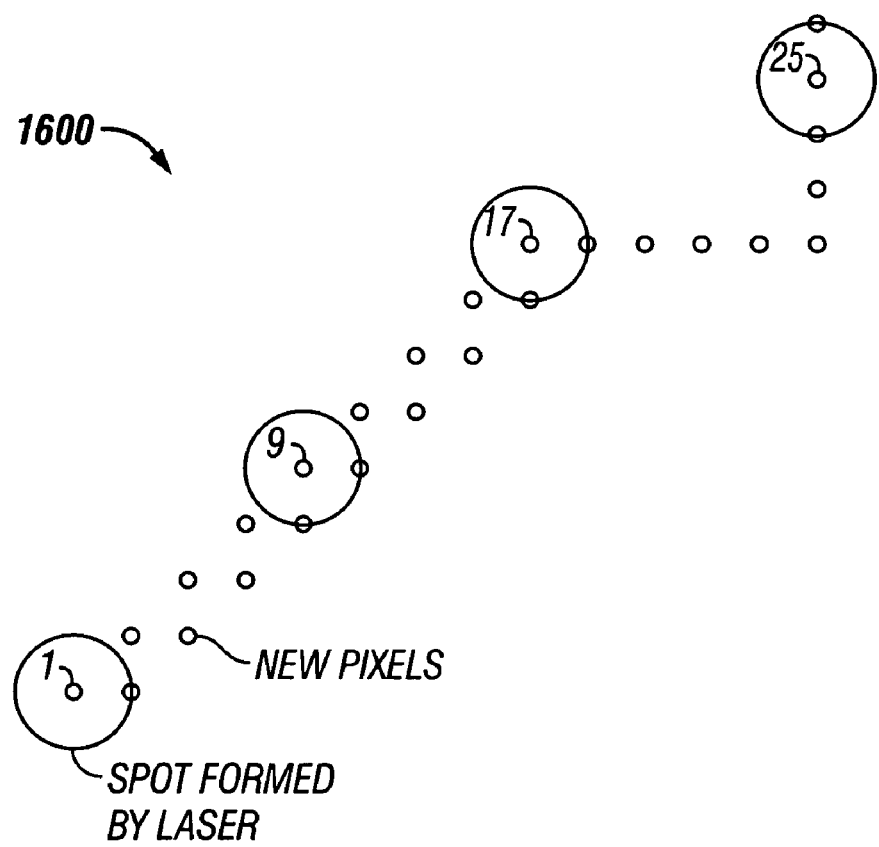
FIG. 16 illustrates a series of line segments forming part of an outline.

Based on points addressed by the digital-to-analog converters, the laser can form visible spots on the product material. The size of each spot that the laser actually marks on a product depends on the material to be marked, the optics, the laser wavelength, the laser power and the dwell time. In most cases, an actual marked spot is many times larger than a single addressable point, as shown in FIG. 16. For example, an actual marked spot may have a diameter of sixteen addressable points. But each spot may be very small, such as 0.008".

Figure 10D:
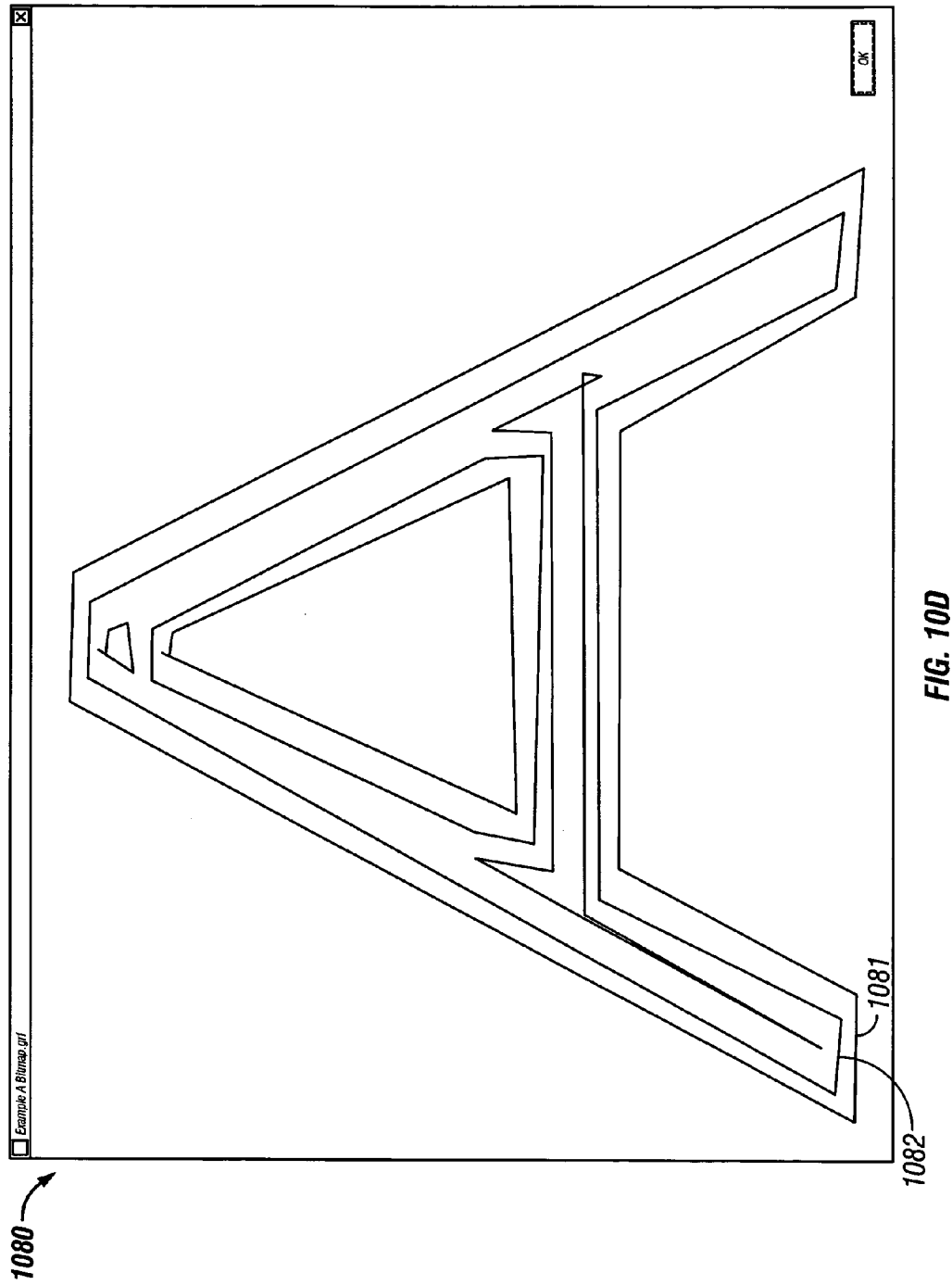
FIG. 10D shows another example of a set of outlines.

The software 802 may provide default parameters in the Image Parameters dialog box 1000. When the user presses the OK button 1022, the software 802 can check for a user specified pre-erosion factor at 915, and remove boundary pixels at 920 a number of times specified by the user. After any pre-erosion, the software 802 outlines each dark area in the user-selected image at 925. For example, if the image is a solid-filled letter "A" in FIG. 6, the software 802 generates a first continuous outline 702A of the letter "A". FIG. 10D shows another example of a set of outlines 1080, which includes a first outline 1081 and a second outline 1082.

If there are multiple dark areas in the image, the software 802 generates a list of outlines for the dark areas in the image. Each outline includes several line segments joining multiple addressable points. The points are grouped into line segments in an order that the laser will move between points. The points are stored as data into memory. The laser can dwell at each N addressed point to form a pattern, where N is set by Steps Between Points 1010. Steps Between Points 1010 sets the distance between points in the same outline where the laser will dwell to form spots. Steps Between Points 1010 is measured along the direction of each line. If Steps Between Points 1010 is set to "1", then the laser will dwell at every point in the outline, but this may be inefficient since an actual spot formed by the laser may be several points wide in diameter. The smaller the value of Steps Between Points 1010, the closer together the points are, the longer it takes to mark, the more the mark resembles a continuous line, and the more laser power is delivered to the material. The larger the value of Steps Between Points 1010, the more distinct the points are, the less laser power is delivered to the target and the more quickly the image marks.

After outlining each dark area, the software 802 checks for a user specified contour progression setting at 930, and the software 802 removes all boundary pixels of dark areas from the original image at 935 a user-specified number of times. A boundary pixel is a dark pixel with at least one adjacent light pixel. Thus, the dark areas of the original image to be marked are reduced in size.

The software 802 checks to see if any dark areas of the image remain, or if there are outlines left to draw when in the outline only mode described further below, at 940. If so, the software 802 outlines each remaining dark area again, which creates another outline within the first outline or another set of outlines within the first set of outlines. For example, the second outline 702B of the letter "A" in FIG. 7 is within the first outline 702A. As another example, the second outline 1082 in FIG. 10D is within the first outline 1081. The software 802 repeats the outline-and-erode sequence until all dark areas of the image disappear. Thus, the software 802 creates and displays a set of continuous, concentric outlines 702A–702C (FIG. 7) that visually approximate the original image 600 (FIG. 6) at 945.

Points Between Outlines 1002 (the contour progression factor) allows a user to control how many boundary points are removed between outlines, e.g., control spacing between concentric outlines. The smaller the value of Points Between Outlines 1002, the closer together the outlines are marked, the more laser power is delivered to the target and the more slowly the image marks. The larger the value of Points Between Outlines 1002, the farther apart the outlines are marked, the less laser power is delivered to the target and the quicker the image marks. Points Between Outlines 1002 effectively determines a total number of line segments of points that will be used to mark dark areas of the image. The total number of line segments of points in turn affects the time required to mark the image. By properly selecting (a) the spacing between marks along each outline and (b) the number of boundary pixels removed between the creation of outlines, efficient and accurate marking of a graphic image can be achieved.

The software 802 may cause the laser unit to mark around the boundaries of dark areas in the image, such as by ½ point. The laser's spot size further spreads the marked area. As a result, high resolution images, such as Chinese text, may appear distorted. The original dark areas may appear close together, and the width of the mark made by the laser may join some of the dark areas.

As a solution, Pre-Erosion 1004 (FIG. 10B) sets a number of boundary pixels removed before the first outline is marked. Removed boundary pixels compensate for marking outside the dark areas by shrinking the dark areas before the first mark is made. Pre-Erosion 1004 increases the size of light areas in an image. Original lines in the image should be more than two pixels thick to survive being eroded once. Eroding an image with thin dark areas may delete the dark areas entirely if Pre-Erosion 1004 is too large. Zero is a valid value for Pre-Erosion 1004. Alternatively, the user may use graphics software such as MS Paint to separate the characters in the original image or change the color conversion threshold to decrease the size of the dark areas.

Converting the list of pixels in the original bitmap to outlines of points involves a tradeoff between accuracy and a number of line segments. Selecting very high accuracy may cause a line segment to be created for every original dark pixel. In one configuration, the software 802 may be able to generate about 8,000 line segments per image.

Tolerance 1012 (or error allowed) determines how far a line segment can diverge from the ideal before a new line segment is created. A small value of Tolerance 1012 forces many short line segments to follow curves. A large value of Tolerance 1012 represents low accuracy, which results in fewer line segments created and may distort the image being marked. Very large values of Tolerance 1012 may create boundaries that are not concentric. Large values of Tolerance 1012 tend to straighten the curves in the image. Right angles tend to lean over, and text may become distorted at very low accuracies.

The laser unit 12 does not use ink but filling large dark areas may take some time. Outline Only 1006 allows marking to be limited to the outer boundaries. If Outline Only 1006 is checked, the Outlines box 1008 enables the user to specify how many outlines to mark. When a single outline is not visible, marking additional outlines at small spacing increases the visual impact. In Outline Only mode, Points between Outlines 1002 controls the spacing between outlines when Outlines 1008 is set greater than one. If Outlines 1008 is set to one, Points between Outlines 1002 does not affect the image.

Dwell Time 1014 for each spot is used to calculate the total time (in microseconds) required to mark the image, as shown in FIG. 1C. Dwell Time 1014 does not affect the image converting process by the software 802. Dwell Time 1014 is included to provide a guideline of estimated total time while creating images. Actual dwell time may be adjusted at the user interface 30 in FIG. 1A. Alternatively, there may be no dwell time setting, such as in a vector-based laser printing system.

The display area of the PC display may limit the maximum size of an original image the software 802 can process to 1024 by 1024 pixels. Output Scaling 1016 allows a user to create images larger than 1024 by 1024 pixels. The software 802, running on a suitable PC, can read images larger than 1024 pixels wide. For a laser unit with a 2" aperture, a 1024-pixel wide image marks as 0.5" wide. An Output Scaling of 2× results in a 1024-pixel wide image marking as 1.0" wide. An Output Scaling of 4× would fill the aperture and mark at 2.0". Output Scaling is not intended to control the exact size of the marked image. The user should adjust the size of the image with a graphics application 806 for graphic editing by setting the resolution of the original bitmap. If the starting image becomes too large for the graphics application 806 to process, Output Scaling 1016 provides a way to continue increasing the size of the image marked.

The Image parameters box 1000 also allows a user to select a type of laser 1024 that will be used, an intended focal length 1026, units 1028 and aperture size 1030. The rulers 1009 and the aperture can be displayed in millimeters, centimeters or inches.

Offset in Aperture 1018, 1020 allows the user to move the resulting mark away from the center of the aperture. The software 802 can provide limited formats that mix text and graphics. The user can combine Text Segments with different Offset in Aperture values to center the resulting mark in the aperture. Positive X 1018 moves the image to the right and positive Y 1020 moves the image down. Offset in Aperture values are signed, so negative X moves to the left and negative Y moves up.

When the user presses the OK button 1022, the software 802 causes the computer to display a black image 1070. Each point to be marked is turned light, as shown in FIG. 1C. A Results box 1071 reports the time to mark the image and the number of segments required. The image 1070 shows how the resulting points will distribute over the threshold image 1001 (FIG. 10A).

The user can then evaluate the image, and if the image is not satisfactory, presses a Re-image button 1005. The Image Parameters dialog 1000 appears again to allow the user to adjust any parameter(s). The resulting image is processed with the new parameters and displayed with a Results box for the new settings.

To adjust the threshold, the user can press the Image button 1003; the screen momentarily displays the original bitmap 1001. The contrast spin control 1007 allows the user to adjust the threshold. When the user achieves the desired threshold, the user can press the Image button 1003 again; the Image Parameters dialog 1000 appears to allow the user to adjust any parameter(s).

When the user achieves a satisfactory result, the user presses the Save As button 1072. A file save dialog appears to allow the user to navigate to the folder where the user wishes to save the processed image and to enter a name for the image file. Once the file is saved, the software 802 may close. A Cancel button 1073 is also provided.

The user may use another application, such as Expert™ application 804 described above, to download the resulting *.grf file. The laser printing system 810 can be used to mark the image and evaluate the results. The line segments may be adjusted to achieve a desired image.

Figure 11:
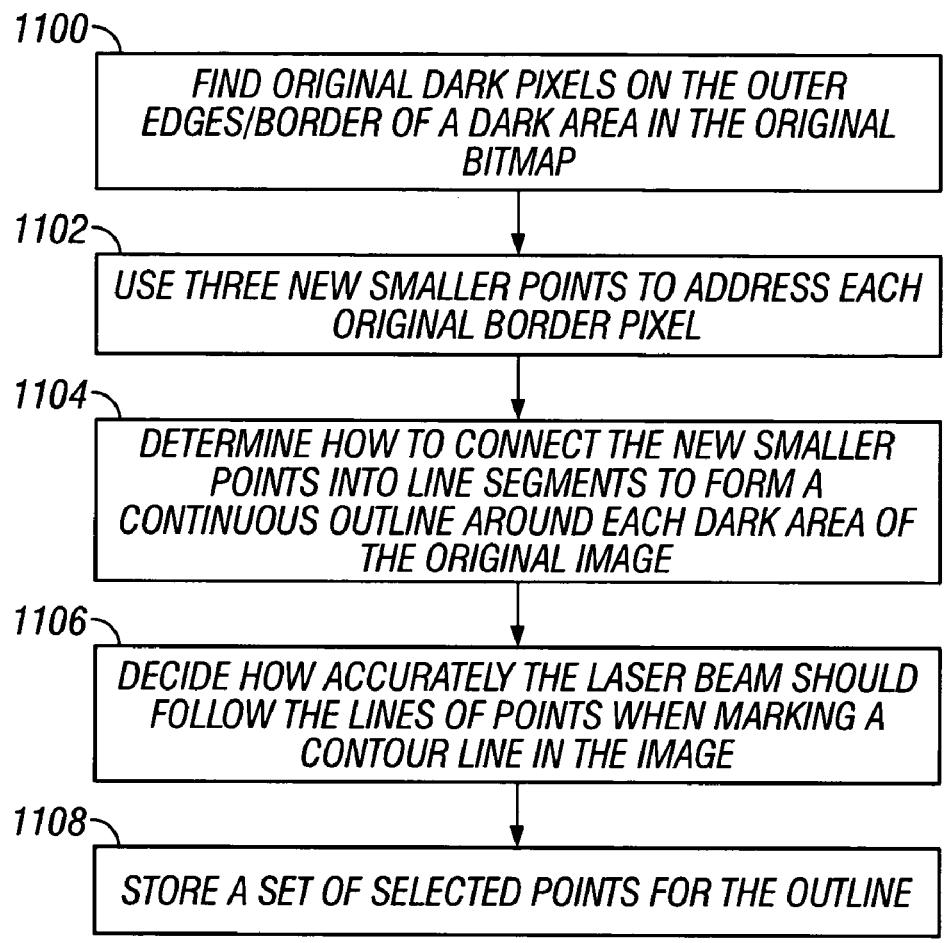
FIG. 11 illustrates an example technique as may be used by the software to form an outline around a dark area in an original bitmap image.

FIG. 11 illustrates an example technique as may be used by the software 802 to form an outline (FIGS. 7 and 10D) around a dark area in an original bitmap image (FIGS. 6 and 10A). The software 802 finds original dark pixels on the outer edges/border of a dark area in the original bitmap at 1100, uses three higher resolution points to address each original border pixel at 1102, determines how to connect the higher resolution points into line segments to form a continuous outline around each dark area of the original image at 1104, and then decides how accurately the laser beam should follow the lines of points when marking a contour line in the image at 1106. The software 802 then stores a set of selected points for the outline at 1108.

Figure 12:
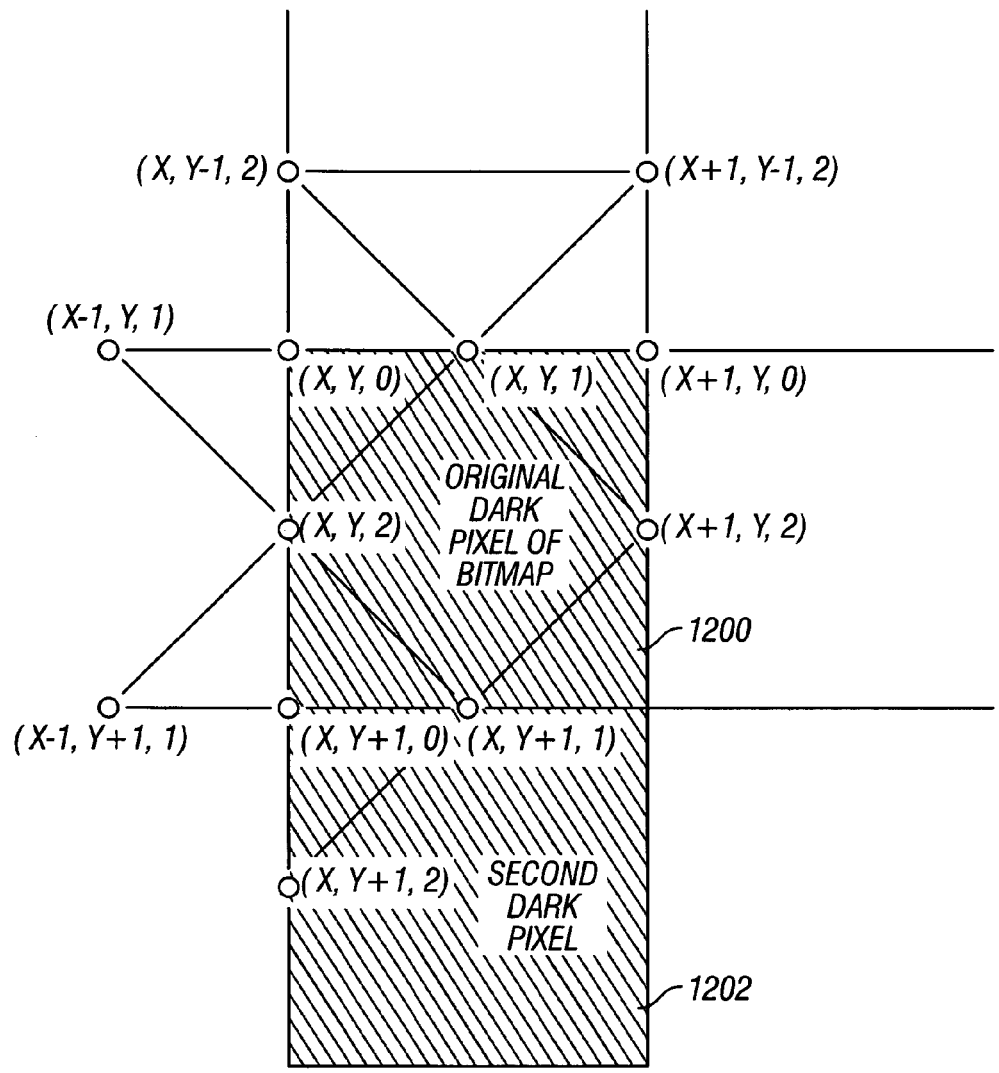
FIG. 12 illustrates an example of two dark border pixels (shaded area) of the original bitmap being addressed by higher resolution points of the software.

FIG. 12 illustrates an example of two dark border pixels 1200, 1202 (shaded area) of the original bitmap (FIGS. 6 and 10A) being addressed by smaller points of the software 802. The software 802 addresses the first dark pixel 1200 of the original bitmap with three higher resolution points $(x, y, 0)$, $(x, y, 1)$, $(x, y, 2)$, which are shown as circles in FIG. 12. The three higher resolution points may be joined with other new points to form a contour line in a new converted image with a resolution twice as high as the original bitmap image. The software 802 addresses the second dark pixel 1202 of the original bitmap with three smaller points $(x, y+1, 0)$, $(x, y+1, 1)$, $(x, y+1, 2)$. The other small points (circles) in FIG. 12 may address other original pixels of the original bitmap.

Next, the software 802 determines how to connect the higher resolution points into line segments to form a continuous outline around a dark area of the original image at 1104. For example, a line segment may be formed by new points $(x+1, y, 0)$, $(x, y, 1)$, $(x, y, 0)$, $(x, y, 2)$, $(x, y+1, 0)$ and $(x, y+1, 2)$. Each new point may be associated with a bit array of 8 bits or 16 bits.

Figure 13A:
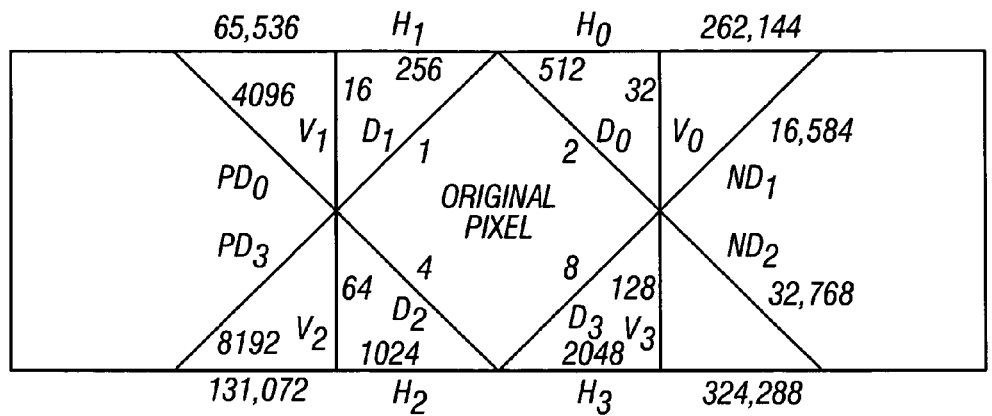
FIG. 13A illustrates 16 possible line segments associated with the original pixel as labeled.
Figure 13B:
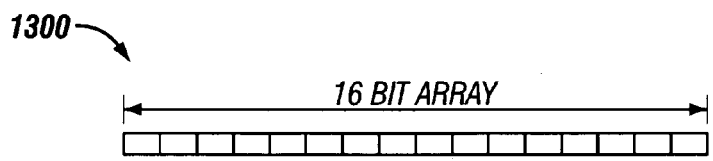
FIG. 13B illustrates a 16-bit array that can designate the 16 line segments in FIG. 13A.

FIG. 13A illustrates 16 possible line segments associated with the original pixel as labeled, plus an additional two line segments associated with an adjacent pixel. FIG. 13B illustrates a 16-bit array 1300 that can designate the 16 line segments in FIG. 13A. The 16-bit array may be associated with one new point in FIG. 12 or more than one new point.

Figures 14A, 14B, 14C:
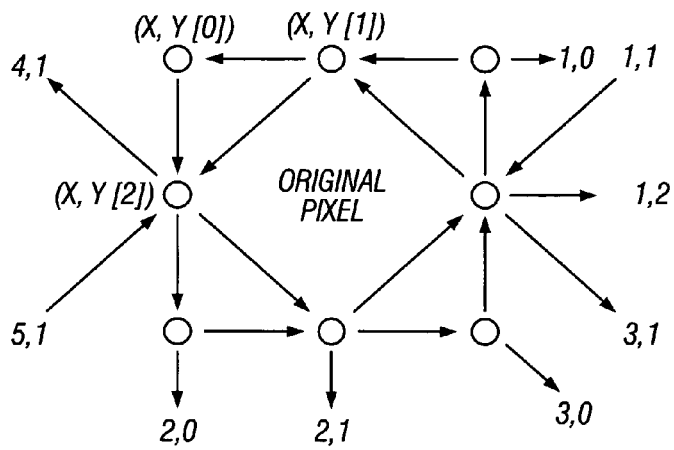
FIG. 14A illustrates the possible line segments and directions that can surround a pixel from the original image.
FIG. 14B illustrates sixteen line segments and their corresponding directions.
FIG. 14C illustrates a single new point and eight possible directions.
Figure 15A:
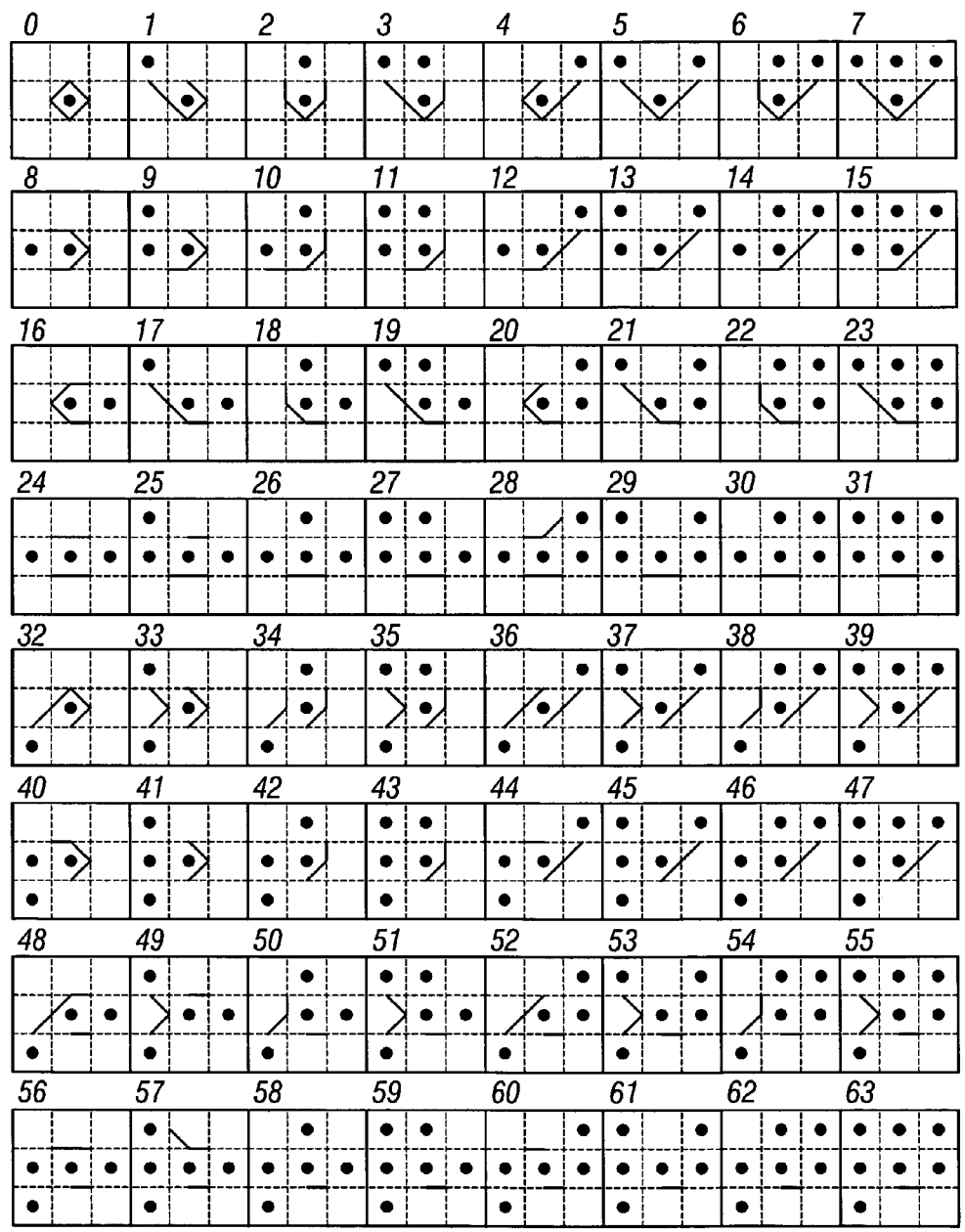
Figure 15C:
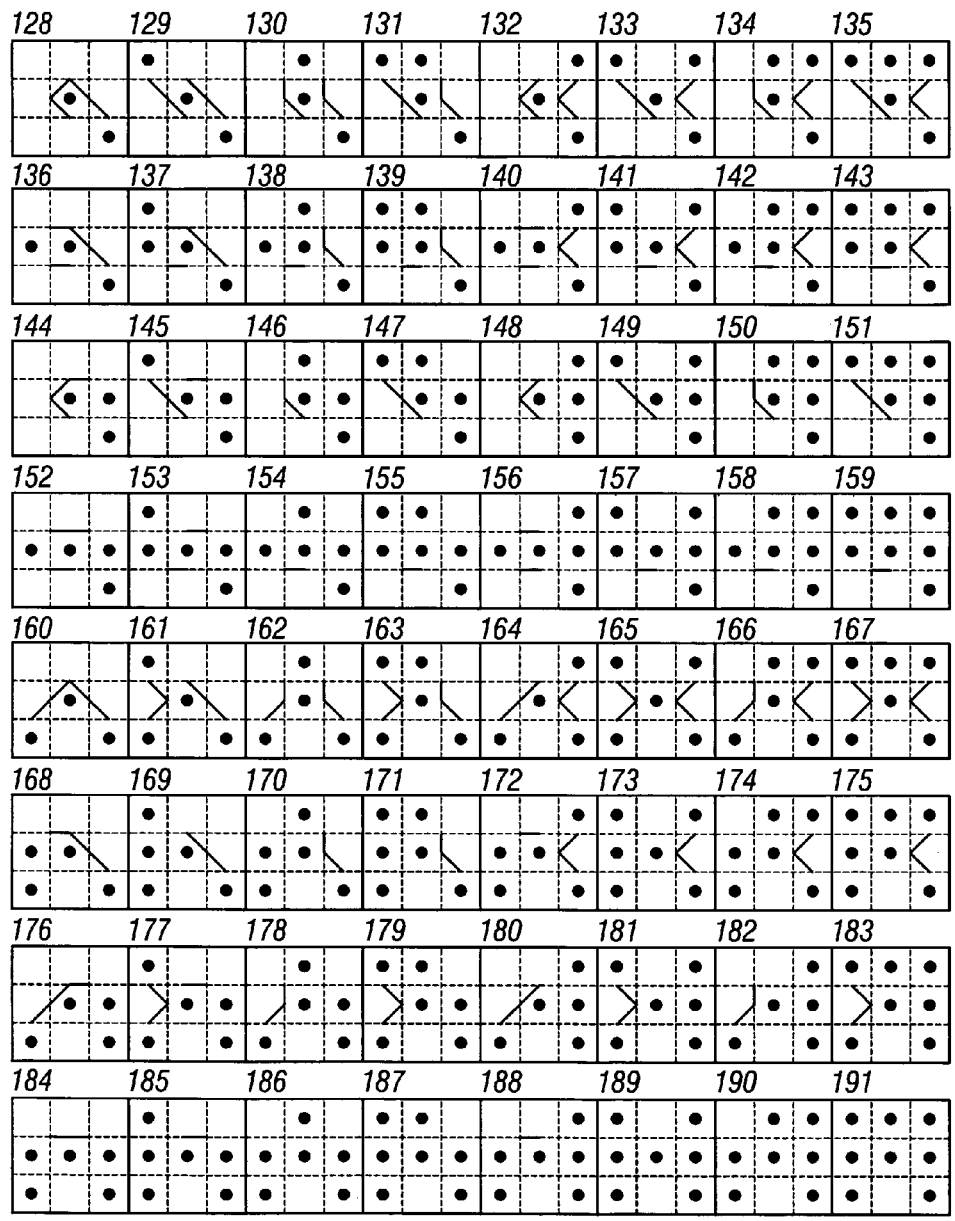

FIG. 14A illustrates the possible line segments and directions for three new points $(x, y, 0)$, $(x, y, 1)$, $(x, y, 2)$ representing an original pixel. FIG. 14B illustrates sixteen line segments and their corresponding directions. FIG. 14C illustrates a single new point and eight possible directions.

FIGS. 15A–15D illustrate 256 possible combinations (labeled 0–255) of forming line segments for 256 possible combinations of nine pixels of the original image. Dark pixels are indicated as dots. Each set of nine pixels has a dark center pixel and zero or more other dark pixels. For example, the top left block in FIG. 14A shows a single dark pixel with four line segments forming an outline around the dark pixel. Typically, a dark area of an image has a width or thickness of multiple pixels, not just one.

After forming a continuous outline around each dark area of the original image, the software 802 then decides how accurately the laser beam should follow the line segments when marking an image at 1106. This is determined by the Tolerance parameter 1012 described above with reference to FIG. 10B.

FIG. 16 illustrates a series of line segments 1600 forming part of an outline. The line segments join points. Steps Between Points 1010 in FIG. 10B determines which points are actually marked by the dwelling laser beam. As shown, Steps Between Points 1010 is set to 8 in FIG. 16.

Figure 17:
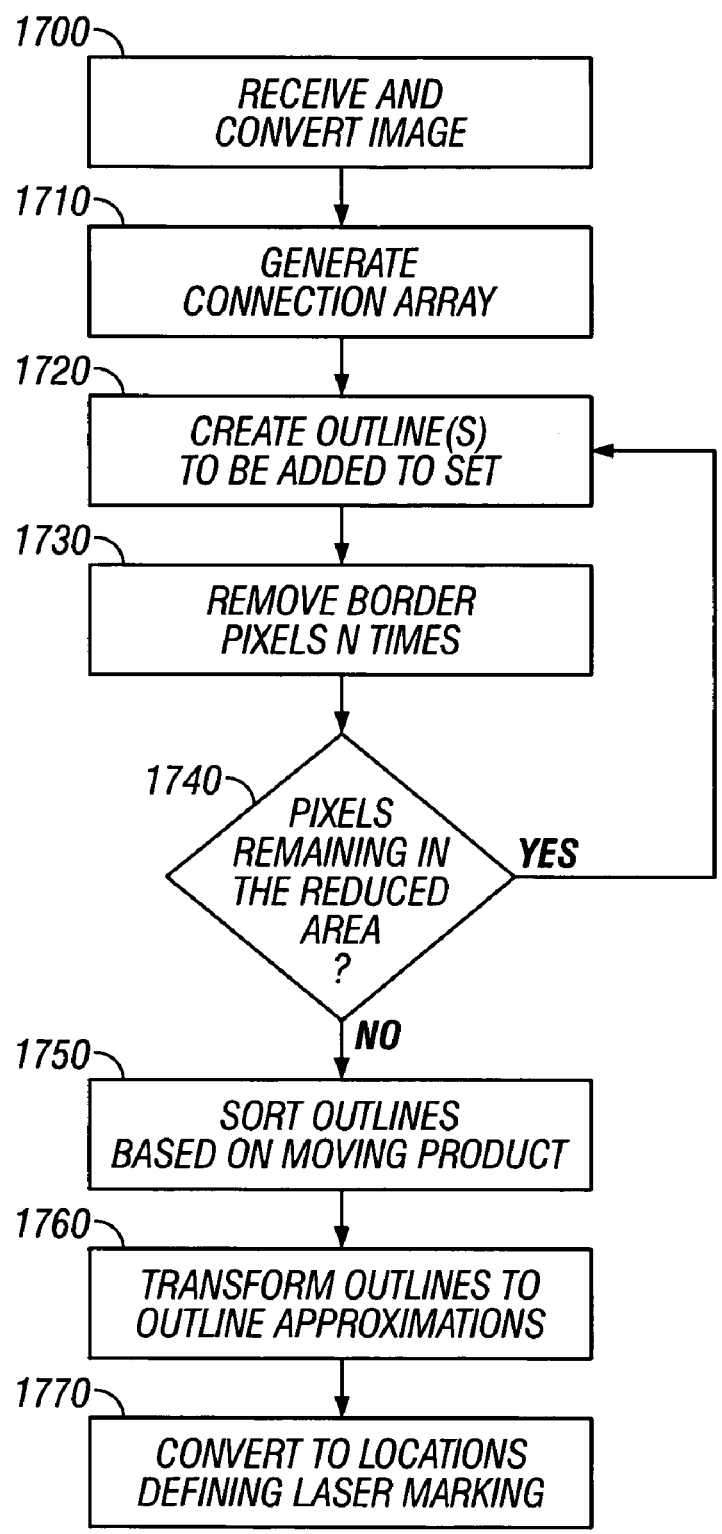
FIG. 17 illustrates an example technique of forming an outline and generating locations defining laser marking.

FIG. 17 illustrates an example technique of forming an outline and generating locations defining laser marking. An image is received at 1700. If needed, the image can be converted to monochrome, where each pixel in the image has one of two states corresponding to mark and clear. A connection array can be generated at 1710. This can involve initializing an empty connection array of size (2x+1) by (2y+1) entries, where the original image is x by y pixels. Each entry of the connection array can include any of the eight connections illustrated in FIG. 14C, where the indication of connection alone does not imply direction.

Filling the connection array can involve, for each pixel to be marked in the image, locating the matching pattern from the connection diagrams in FIGS. 15A–15D and copying all of the connections from the matching pattern into the connection array. In the connection diagrams shown in FIGS. 15A–15D, the pixel matches the center pixel in each individual diagram, as they are to be marked. The state of that pixel's eight neighbor pixels determines which pattern is chosen. Neighbor pixels beyond the borders of the monochrome image can be considered to be in the mark state. Once the connection array is filled, each point in the connection array has either zero or two connections due to the connection patterns specified in FIGS. 15A–15D.

One or more outlines are then created and added to a set of outlines for the image at 1720. This can be done using a process as defined by the following pseudo code:

Thus, a set of outlines is created, each outline being an ordered set of points. Connecting these points, in order, creates an outline surrounding a contiguous group of pixels to be marked in the original image at twice the resolution of the original image.

Border pixels can then be removed N times at 1730. N can be one, or a larger, user-selected number. For example, an empty list of pixels to be set to non-marking state can be created. For each pixel to be marked in the image, if this pixel has a neighbor that is not to be marked, this pixel can be added to the list. All the pixels in the list created in this way can then be set to the non-marking state, and this process can be repeated a user-selected number of times. This removes border pixels from each area of contiguous pixels to be marked, shrinking the area to be marked. If pixels to be marked in the reduced area at 1740, additional outlines can be created by repeating the operations described above, thus adding to the set of outlines already created.

Once all the pixels to be marked have been outlined as described, the resulting set of substantially concentric outlines that fill the area to be marked from the original image are at twice the resolution of the original image and can be used to direct a laser printing system. The outlines can be sorted based on a moving product and the times at which the various parts of the outlines are expected to enter a laser printing aperture at 1750. This can be done to optimize marking for a moving product. One method is to start with the outline that includes the earliest points to enter the aperture during marking and then to sort that outline to start with that earliest point. That process is repeated for the remaining outlines.

Outlines can then be transformed to outline approximations at 1760. For example, this can be done according to the following pseudo code:

```
For each outline {
   beginning point P_B gets the first point in the outline;
   ending point P_E gets the second point in the outline;
   While (additional points remain in the outline after P_E) {
      set tolerance_exceeded_flag to FALSE;
      Do {
         Calculate a line segment between P_B and P_E;
         For each point in the outline between P_B and P_E
            If (its distance from the current line segment exceeds a
               tolerance_setting)
                  set tolerance_exceeded_flag to TRUE;
         If (tolerance_exceeded_flag is FALSE)
            If (a point exists in the outline after P_E) Set P_E to P_{E+1};
            Else Set tolerance_exceeded_flag to TRUE;
      } until (tolerance_exceeded_flag is TRUE)
      If (a point exists in the outline after P_E) {
         output the second to last line segment; [which is from P_B and
P_{E-1}]
```

```
Scan the connection array and while points remain to be scanned {
   If a point having connections is found {
      record this point as a starting point of an outline;
      Do {
         follow a connection to the next point; [for the starting point, select one to follow]
         record this current point as a next point in the outline;
         erase this connection, both from the point just left and from the current point;
      } until (the current point is the starting point)
   } [for each point, one of its connections is erased getting to the point and the other connection
is erased leaving the point]
}
```

```
    set P_B equal to P_{E-1};
  } Else output the last line segment;
  }
}
```

Thus, each outline can be transformed into a set of lines that approximates the outlines.

These lines can be converted to locations defining laser marking at 1770. This conversion can be based on the particular laser printing system being used. For example, for the step-and-repeat, variable dwell time laser printing described above, these lines can be transformed directly into a set of position and mark commands, based on the user-specified move distance between marks. Thus, for each outline: (1) a move command to the start of the first line can be generated; (2) if the distance to the end of the line is less than the user-specified distance, this line is complete; and (3) if the distance to the end of the line is greater than the user-specified distance, a mark command for that line can be created, and the mark repeats.

Although the present application has been described in detail, it should be understood that various changes, combinations, substitutions and alterations can be made without departing from the spirit and scope of the application as described by the appended claims. For example, other ways of converting an original bitmap image (FIGS. 6 and 10A) into a set of outlines (FIGS. 7 and 10D) may be implemented.

What is claimed is:

1. A method comprising:
using a laser to mark an image on a product, the image comprising at least one marking area and at least one non-marking area, each marking area comprising a set of substantially concentric outlines, each outline comprising a set of points, wherein the laser generates a laser beam that dwells at each point, according to a programmable dwell time, to alter a visible optical characteristic of the product.

2. The method of claim 1, further comprising:
receiving an original image comprising a plurality of pixels, the original image having at least one marking area and at least one non-marking area; and
generating the image to be marked, which visually approximates the original image, the image to be marked comprising substantially concentric outlines for each marking area in the original image, each outline comprising a set of points.

3. A method comprising:
receiving a first image comprising a plurality of pixels, the first image having one or more marking areas and non-marking areas;
generating a second image that visually approximates the first image, the second image comprising a set of substantially concentric outlines for each marking area in the first image, each outline comprising a set of points; and
using a laser to mark the second image on a product in accordance with the set of substantially concentric outlines.

4. The method of claim 3, further comprising converting an original color image to the first image by forcing pixels in the original color image into marking and non-marking areas of the first image based on an intensity threshold.

5. The method of claim 4, further comprising allowing a user to adjust the intensity threshold.

6. The method of claim 3, wherein using the laser to mark the second image on the product comprises marking the substantially concentric outlines from an outside in.

7. The method of claim 3, wherein generating the second image comprises:
outlining each marking area in the first image with a first set of points;
selecting a first sub-set of points from the first set of points, the first sub-set of points to be marked by the laser beam;
storing the first sub-set of points as part of the second image in a memory;
removing all boundary pixels from each marking area of the first image;
outlining each remaining marking area in the first image with a second set of points;
selecting a second sub-set of points from the second set of points, the second sub-set of points being marked by the laser beam;
storing the first sub-set of points as part of the second image in a memory; and
repeating said outlining, selecting, storing and removing until all marking areas have been removed.

8. The method of claim 7, further comprising allowing a user to select a number of border pixels of the first image to remove between consecutive outlines.

9. The method of claim 7, wherein each outline comprising a plurality of line segments.

10. The method of claim 9, further comprising allowing a user to select an amount that an outline will diverge from a plurality of line segments.

11. The method of claim 7, further comprising allowing a user to select a number of boundary pixels of each marking area in the first image to remove before outlining each marking area in the first image with the first set of points.

12. The method of claim 7, further comprising determining a path that the laser beam will travel between points of the first sub-set.

13. The method of claim 3, further comprising allowing a user to select between an outline-only image and a fill image.

14. The method of claim 3, further comprising allowing a user to select a number of outlines of each marking area to mark with the laser.

15. The method of claim 3, further comprising allowing a user to select an amount of scaling for the second image to be marked with the laser.

16. The method of claim 3, further comprising allowing a user to select an amount of vertical offset for the second image to be marked with the laser.

17. The method of claim 3, further comprising allowing a user to select an amount of horizontal offset for the second image to be marked with the laser.

18. The method of claim 3, further comprising:
displaying the second image; and
allowing a user to select parameters to modify the second image.

19. A system comprising:
one or more data processing machines operable to (a) receive a first image comprising a plurality of pixels, the first image having one or more marking areas and non-marking areas; and (b) generate a second image that resembles the first image, the second image comprising a set of substantially concentric outlines for each marking area in the first image, each outline comprising a set of points; and a laser coupled with the one or more data processing machines, the laser operable to generate a laser beam to mark the second image on the surface.

20. The system of claim 19, wherein the one or more data processing machines comprise a computer including a display to show the second image to a user, the computer allowing the user to select parameters and manipulate the second image.

21. The system of claim 19, wherein the first image is a bitmap.

22. The system of claim 19, further comprising a memory coupled to the laser to store the second image.

23. A method comprising:
converting an image to a set of locations by defining progressively smaller contours of the image; and
marking a material by directing a laser beam according to the locations.

24. The method of claim 23, wherein converting the image comprises:
identifying a set of points that trace boundary pixels of a marking area of the image such that the set of points form a contour of the marking area;
removing the boundary pixels from further consideration with respect to defining the contours for the marking area;
repeating the identifying and the removing until all pixels of interest in the marking area have been considered; and
determining the locations from the identified points.

25. The method of claim 24, wherein identifying the set of points comprises identifying points taken from an image space of higher density than that of the image.

26. The method of claim 25, wherein identifying the set of points further comprises identifying the points based on a programmable tolerance value.

27. The method of claim 24, wherein removing the boundary pixels comprises removing pixels from further consideration based on a programmable contour progression factor.

28. The method of claim 24, wherein the pixels of interest are defined by a programmable outline only setting.

29. The method of claim 24, wherein determining the locations comprises determining the locations from the identified points based on a programmable step size.

30. The method of claim 24, wherein the image comprises a generated image, and the method further comprises forming the generated image from a source image based on a programmable intensity threshold.

31. The method of claim 24, further comprising initially removing boundary pixels of the marking area from any consideration based on a programmable pre-erosion value.

32. The method of claim 24, wherein marking the material comprises continuously directing the laser beam according to the locations, in an order corresponding to the progressively smaller contours, using a step-and-repeat, variable dwell time laser printer.

33. The method of claim 23, wherein marking the material comprises directing the laser beam onto a moving product according to the locations, in an order corresponding to the progressively smaller contours and corresponding to times at which the progressively smaller contours enter a laser printing aperture.

34. The method of claim 33, wherein the progressively smaller contours include overlapping contours.

35. A system comprising:
a laser operable to produce a printing beam;
an optics assembly operable to focus and direct the printing beam; and
one or more machines operable to convert an image to a set of locations by defining progressively smaller contours of the image, and mark a material by controlling the laser and the optics assembly to direct the printing beam according to the locations.

36. The system of claim 35, wherein conversion of the image to the set of locations includes performing operations comprising:
identifying a set of points that trace boundary pixels of a marking area of the image such that the set of points form a contour of the marking area;
removing the boundary pixels from further consideration with respect to defining the contours for the marking area;
repeating the identifying and the removing until all pixels of interest in the marking area have been considered; and
determining the locations from the identified points.

37. A machine-readable medium storing software program operable to cause one or more machines to perform operations comprising:
converting an image to a set of locations by defining progressively smaller contours of the image; and
marking a material by directing a laser beam according to the locations.

38. The machine-readable medium of claim 37, wherein converting the image comprises:
identifying a set of points that trace boundary pixels of a marking area of the image such that the set of points form a contour of the marking area;
removing the boundary pixels from further consideration with respect to defining the contours for the marking area;
repeating the identifying and the removing until all pixels of interest in the marking area have been considered; and
determining the locations from the identified points.

* * * * *